(12) United States Patent
Tatti et al.

(10) Patent No.: US 11,461,671 B2
(45) Date of Patent: Oct. 4, 2022

(54) DATA QUALITY TOOL

(71) Applicant: Bank of America Corporation, Charlotte, NC (US)

(72) Inventors: Deviprasad Tatti, Hyderabad (IN); Suresh V. Kamboji, Hyderabad (IN); Vibhash K. Jha, Hyderabad (IN)

(73) Assignee: Bank of America Corporation, Charlotte, NC (US)

( * ) Notice: Subject to any disclaimer, the term of this patent is extended or adjusted under 35 U.S.C. 154(b) by 770 days.

(21) Appl. No.: 16/429,632

(22) Filed: Jun. 3, 2019

(65) Prior Publication Data
US 2020/0380379 A1 Dec. 3, 2020

(51) Int. Cl.
*G06F 16/00* (2019.01)
*G06N 5/02* (2006.01)
*G06F 16/215* (2019.01)
*G06N 20/00* (2019.01)
*G06F 17/16* (2006.01)
*G06F 16/22* (2019.01)

(52) U.S. Cl.
CPC .......... *G06N 5/025* (2013.01); *G06F 16/215* (2019.01); *G06F 16/221* (2019.01); *G06F 17/16* (2013.01); *G06N 20/00* (2019.01)

(58) Field of Classification Search
None
See application file for complete search history.

(56) References Cited

U.S. PATENT DOCUMENTS

| | | |
|---|---|---|
| 5,307,262 A | 4/1994 | Ertel |
| 5,701,400 A | 12/1997 | Amado |
| 5,960,430 A | 9/1999 | Haimowitz |
| 6,351,553 B1 | 2/2002 | Hayosh |
| 6,449,650 B1 | 9/2002 | Westfall |
| 6,598,034 B1 | 7/2003 | Kloth |
| 6,804,778 B1 | 10/2004 | Levi |
| 7,231,612 B1 | 6/2007 | Mani |
| 7,302,313 B2 | 11/2007 | Sharp |
| 7,327,287 B2 | 2/2008 | Martinian |
| 7,551,922 B2 | 6/2009 | Roskowski |
| 7,580,946 B2 | 8/2009 | Mansour |
| 7,680,855 B2 | 3/2010 | Hyder |
| 8,024,114 B2 | 9/2011 | Doyle |
| 8,046,385 B2 | 10/2011 | Wald |
| 8,260,907 B2 | 9/2012 | O'Sullivan |
| 8,392,826 B2 | 3/2013 | Randall |
| 8,601,326 B1 | 7/2013 | Kirn |
| 8,515,774 B2 | 8/2013 | Abraham Fuchs |
| 8,606,497 B2 | 12/2013 | Doherty |

(Continued)

*Primary Examiner* — Bai D Vu

(57) ABSTRACT

An apparatus includes a database and a processor. The database stores a set of columns and rules assigned to each column. The rules are used to assess the quality of the data stored in the columns. The processor determines, based in part on the set of rules, the set of columns, and metadata and statistical properties of the columns, a machine learning policy adapted to generate a set of candidate rules for a given column. The processor further determines those columns of the set of columns that are similar to a subject column based on the names of the columns and the names of the tables storing the columns. The processor applies the machine learning policy to the subject column of data, rules of the similar columns, and metadata and statistical properties of the subject column to determine a set of candidate rules for the subject column.

20 Claims, 7 Drawing Sheets

(56) References Cited

U.S. PATENT DOCUMENTS

| | | |
|---|---|---|
| 8,849,736 B2 | 1/2014 | Miranda |
| 8,645,092 B2 | 2/2014 | Manning |
| 8,666,919 B2 | 3/2014 | Miranda et al. |
| 8,700,577 B2 | 4/2014 | Yeh |
| 8,731,983 B2 | 5/2014 | Gudla et al. |
| 8,762,363 B1 | 6/2014 | Koo et al. |
| 8,768,731 B2 | 7/2014 | Moore |
| 9,152,627 B2 | 10/2015 | Kung et al. |
| 9,152,662 B2 | 10/2015 | Bhide et al. |
| 9,292,306 B2 | 3/2016 | Day |
| 9,547,824 B2 | 1/2017 | Indeck |
| 9,646,262 B2 | 5/2017 | Phillipps et al. |
| 9,712,665 B2 | 7/2017 | Adar |
| 9,959,502 B2 | 5/2018 | Flores et al. |
| 10,097,403 B2 | 10/2018 | Anand |
| 10,127,264 B1 | 11/2018 | Pyle |
| 10,185,728 B2 | 1/2019 | Nath et al. |
| 2005/0066240 A1 | 3/2005 | Sykes |
| 2005/0071283 A1 | 3/2005 | Randle |
| 2005/0108631 A1 | 5/2005 | Amorin |
| 2008/0319829 A1 | 1/2008 | Hunt |
| 2015/0310500 A1 | 7/2015 | Nolet |

DATA QUALITY TOOL

TECHNICAL FIELD

This disclosure relates generally to data storage and more specifically to data quality assessment.

BACKGROUND

Organizations frequently store large quantities of data in their systems. Such data is often used internally as a basis for organizational decisions as well as externally by customers of the organizations.

SUMMARY

Organizations frequently store large quantities of data in their systems. Such data is often used internally as a basis for organizational decisions, analytics, and reporting, as well as externally by customers of the organizations and in downstream applications. Accordingly, it is important for organizations to ensure the accuracy of the data stored in their systems. To this end, organizations typically implement data quality assessment procedures to help ensure that the data is fit for use.

Data quality assessment procedures typically involve defining adequate acceptance criteria, from which data quality rules are generated, such that when applied to data stored in a system, the rules help to identify and flag suspect data for remediation. For example, a data quality rule for a column of data storing a set of dates may check that the dates are stored in a proper format, such as xx/xx/xxxx. Such a rule will label an entry in a column of dates having a value of 10/133/2004 as likely erroneous.

Typically, the data quality rules present in a system are generated manually, by system administrators. Such rules tend not to change over time and are generally not comprehensive, given the time and effort required to generate and test different data quality rules for the huge amount of data stored in a typical system. Consequently, much of the data stored in a system may undergo no more than a minimal data quality check. For example, consider again the format checking rule discussed above, for a column of data storing a set of dates. While this data quality rule provides a minimal check on the quality of the data by helping to ensure that it is logically correct from a formatting point of view, many types of errors other than formatting errors are possible for date data stored in a column. As a result, additional data quality rules are likely desirable, depending on the particular type of data stored in the column. For example, if the dates stored in the column correspond to birth dates, a second data quality rule might check to ensure that none of the dates are dates in the future. A third possible data quality rule could further check that none of the dates, when measured to the present date, result in an age greater than 150 years. Given the time and effort required to develop such comprehensive rules, it is likely not feasible to manually undertake a comprehensive rule generation process, for all the different types of data stored by a system.

Additionally, typical data quality rules are unable to take into account external and/or internal events that may influence the behavior of the data, given the static nature of manually generated rules. For example, consider a data column storing the number of new customer accounts that a business generates each month. A system administrator may observe that the values stored in this column typically do not vary by more than 20% from the average value. Therefore, the administrator may create a data quality rule that flags a column value as erroneous if it differs by more than 30% from the average value. Under such a rule, if the number of monthly accounts created in one month is greater than the average value by more than 40%, the data for that month will be labeled as erroneous. However, this increase may have been the result of an advertising campaign undertaken by the organization earlier in the month and designed to generate new accounts. If the data quality rule had knowledge of this information and could adapt accordingly, it would likely not label the corresponding data as erroneous.

This disclosure contemplates a data quality tool that addresses one or more of the above issues. The data quality tool implements a machine learning algorithm to generate comprehensive, dynamic data quality rules that take into account the influence of internal and external factors on the data. The machine learning algorithm is used to generate a set of candidate rules for a given column of data based on the metadata of the column, the statistical properties of the column, and rules that have been previously generated (either by a system administrator or the tool itself) for similar columns of data. In this manner, the tool is able to learn from previous rules generated by system administrators that may also be applicable to the column of data under consideration, as well as patterns identified in the data and its metadata, to suggest additional rules that are fit for use with the given column. The resulting set of rules may be used to generate a high-quality data quality measurement, in which any influence from internal and external factors is removed by using machine learning to identify and eliminate the effects of such factors on the data quality rule assessments. Certain embodiments of the data verification tool are described below.

According to one embodiment, an apparatus includes a database and a hardware processor. The database stores a set of columns, a first set of rules, a set of metadata, a set of statistical data, a third column of data, and a third subset of metadata. The set of columns includes a first column of data and a second column of data. The first column of data is assigned to a first column name and a first table name. The second column of data assigned to a second column name and a second table name. The first set of rules includes a first subset of rules assigned to the first column of data and a second subset of rules assigned to the second column of data. Applying a rule of the first set of rules to a piece of data results in a determination that the piece of data either complies with the rule or does not comply with the rule. The set of metadata includes a first subset of metadata assigned to the first column and a second subset of metadata assigned to the second column of data. The set of statistical data includes a first subset of statistical data assigned to the first column of data and a second subset of statistical data assigned to the second column of data. The third column of data is assigned to a third column name and a third table name. The third subset of metadata is assigned to the third column. The hardware processor determines, based in part on the first set of rules, the set of metadata, the set of statistical data, and the set of columns, a first machine learning policy adapted to generate a set of candidate rules for a given column of data. The processor further determines a third subset of statistical properties based on the third column of data. The processor additionally splits the first column name into a first set of features, splits the second column name into a second set of features, and splits the third column name into a third set of features. The processor also determines a first vector based on the first set of features, determines a second vector based on the second set of features, and determines a third vector based on the third set of features. The processor further determines a first similarity index based on a first dot product of the first vector and the second vector, determines a second similarity index based on a second dot product of the first vector and the third vector, and determines a third similarity index based on a third dot product of the second vector and the third vector. The processor additionally determines that the first similarity index is less than a first threshold. The processor also determines that the second similarity index is greater than the first threshold. The processor further determines that the third similarity index is less than the first threshold. In response to determining that the second similarity index is greater than the first threshold, the first similarity index is less than the threshold, and the third similarity index is less than the threshold the processor stores the first column and the third column as a first similarity group. The processor further splits the first table name into a fourth set of features and splits the third table name into a fifth set of features. The processor additionally determines a fourth vector from the fourth set of features and determines a fifth vector from the fifth set of features. The processor also determines a fourth similarity index based on a fourth dot product of the fourth vector and the fifth vector and determines that the fourth similarity index is greater than a second threshold. In response to determining that the fourth similarity index is greater than the second threshold, the processor stores the first vector and the third vector as a second similarity group. The processor further applies the machine learning policy to the first subset of rules, the third subset of metadata, the third subset of statistical properties, and the third column of data to determine a first set of candidate rules for the third column of data.

According to another embodiment, a method includes determining, based in part on a first set of rules, a set of metadata, a set of statistical data, and a set of columns, a first machine learning policy adapted to generate a set of candidate rules for a given column of data. Here, the set of columns includes a first column of data and a second column of data. The first column of data is assigned to a first column name and a first table name and the second column of data is assigned to a second column name and a second table name. The first set of rules includes a first subset of rules assigned to the first column of data and a second subset of rules assigned to the second column of data. Applying a rule of the first set of rules to a piece of data results in a determination that the piece of data either complies with the rule or does not comply with the rule. Additionally, the set of metadata includes a first subset of metadata assigned to the first column and a second subset of metadata assigned to the second column of data, and the set of statistical data includes a first subset of statistical data assigned to the first column of data and a second subset of statistical data assigned to the second column of data. The method further includes determining a third subset of statistical properties based on a third column of data, the third column of data assigned to a third column name and a third table name. The method also includes splitting the first column name into a first set of features, splitting the second column name into a second set of features, and splitting the third column name into a third set of features. The method additionally includes determining a first vector based on the first set of features, determining a second vector based on the second set of features, and determining a third vector based on the third set of features. The method also includes determining a first similarity index based on a first dot product of the first vector and the second vector, determining a second similarity index based on a second dot product of the first vector and the third vector, and determining a third similarity index based on a third dot product of the second vector and the third vector. The method further includes determining that the first similarity index is less than a first threshold. The method also includes determining that the second similarity index is greater than the first threshold. The method further includes determining that the third similarity index is less than the first threshold. In response to determining that the second similarity index is greater than the first threshold, the first similarity index is less than the first threshold, and the third similarity index is less than the first threshold, the method also includes storing the first column and the third column as a first similarity group. The method additionally includes splitting the first table name into a fourth set of features and splitting the third table name into a fifth set of features. The method additionally includes determining a fourth vector based on the fourth set of features and determining a fifth vector based on the fifth set of features. The method further includes determining a fourth similarity index based on a fourth dot product of the fourth vector and the fifth vector. The method further includes determining that the fourth similarity index is greater than a second threshold. In response to determining that the fourth similarity index is greater than the second threshold, the method includes storing the first column and the third column as a second similarity group. The method additionally includes applying the machine learning policy to the first subset of rules, a third subset of metadata assigned to the third column of data, the third subset of statistical properties, and the third column of data to determine a first set of candidate rules for the third column of data.

According to a further embodiment, a system includes a storage element and a processing element. The storage element is operable to store a set of columns, a first set of rules, a set of metadata, a set of statistical data, a third column of data, and a third subset of metadata. The set of columns includes a first column of data and a second column of data. The first column of data is assigned to a first column name and a first table name. The second column of data assigned to a second column name and a second table name. The first set of rules includes a first subset of rules assigned to the first column of data and a second subset of rules assigned to the second column of data. Applying a rule of the first set of rules to a piece of data results in a determination that the piece of data either complies with the rule or does not comply with the rule. The set of metadata includes a first subset of metadata assigned to the first column and a second subset of metadata assigned to the second column of data. The set of statistical data includes a first subset of statistical data assigned to the first column of data and a second subset of statistical data assigned to the second column of data. The third column of data is assigned to a third column name and a third table name. The third subset of metadata is assigned to the third column. The processing element is operable to determine, based in part on the first set of rules, the set of metadata, the set of statistical data, and the set of columns, a first machine learning policy adapted to generate a set of candidate rules for a given column of data. The processing element is further operable to determine a third subset of statistical properties based on the third column of data. The third subset of statistical properties includes at least one of a mean of the third column of data and a range of values of the third column of data. The processing element is additionally operable to split the first column name into a first set of features, split the second column name into a second set of features, and split the third column name into a third set of features. The processing element is also operable to determine a first vector based on the first set of features, determine a second vector based on the second set of features, and determine a third vector based on the third set of features. The processing element is further operable to determine a first similarity index based on a first dot product of the first vector and the second vector, determine a second similarity index based on a second dot product of the first vector and the third vector, and determine a third similarity index based on a third dot product of the second vector and the third vector. The processing element is additionally operable to determine that the first similarity index is less than a first threshold. The processing element is also operable to determine that the second similarity index is greater than the first threshold. The processing element is further operable to determine that the third similarity index is less than the first threshold. In response to determining that the second similarity index is greater than the first threshold, the first similarity index is less than the threshold, and the third similarity index is less than the threshold the processing element is operable to store the first column and the third column as a first similarity group. The processing element is further operable to split the first table name into a fourth set of features and split the third table name into a fifth set of features. The processing element is additionally operable to determine a fourth vector from the fourth set of features and determine a fifth vector from the fifth set of features. The processing element is also operable to determine a fourth similarity index based on a fourth dot product of the fourth vector and the fifth vector and determine that the fourth similarity index is greater than a second threshold. In response to determining that the fourth similarity index is greater than the second threshold, the processing element is operable to store the first vector and the third vector as a second similarity group. The processing element is further operable to apply the machine learning policy to the first subset of rules, the third subset of metadata, the third subset of statistical properties, and the third column of data to determine a first set of candidate rules for the third column of data.

Certain embodiments provide one or more technical advantages. For example, an embodiment produces dynamic data quality rules automatically, saving the time and effort required to manually implement such rules. As another example, an embodiment takes into account the effect of internal and external factors on data quality assessments, reducing the occurrence of false positives that indicate that data is inaccurate, when the data is actually accurate but has been influenced by an internal or external event. As a further example, an embodiment helps ensure that system data accessed by users is accurate. Certain embodiments may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present disclosure, reference is now made to the following description, taken in conjunction with the accompanying drawings, in which.

DETAILED DESCRIPTION

Figure 1:
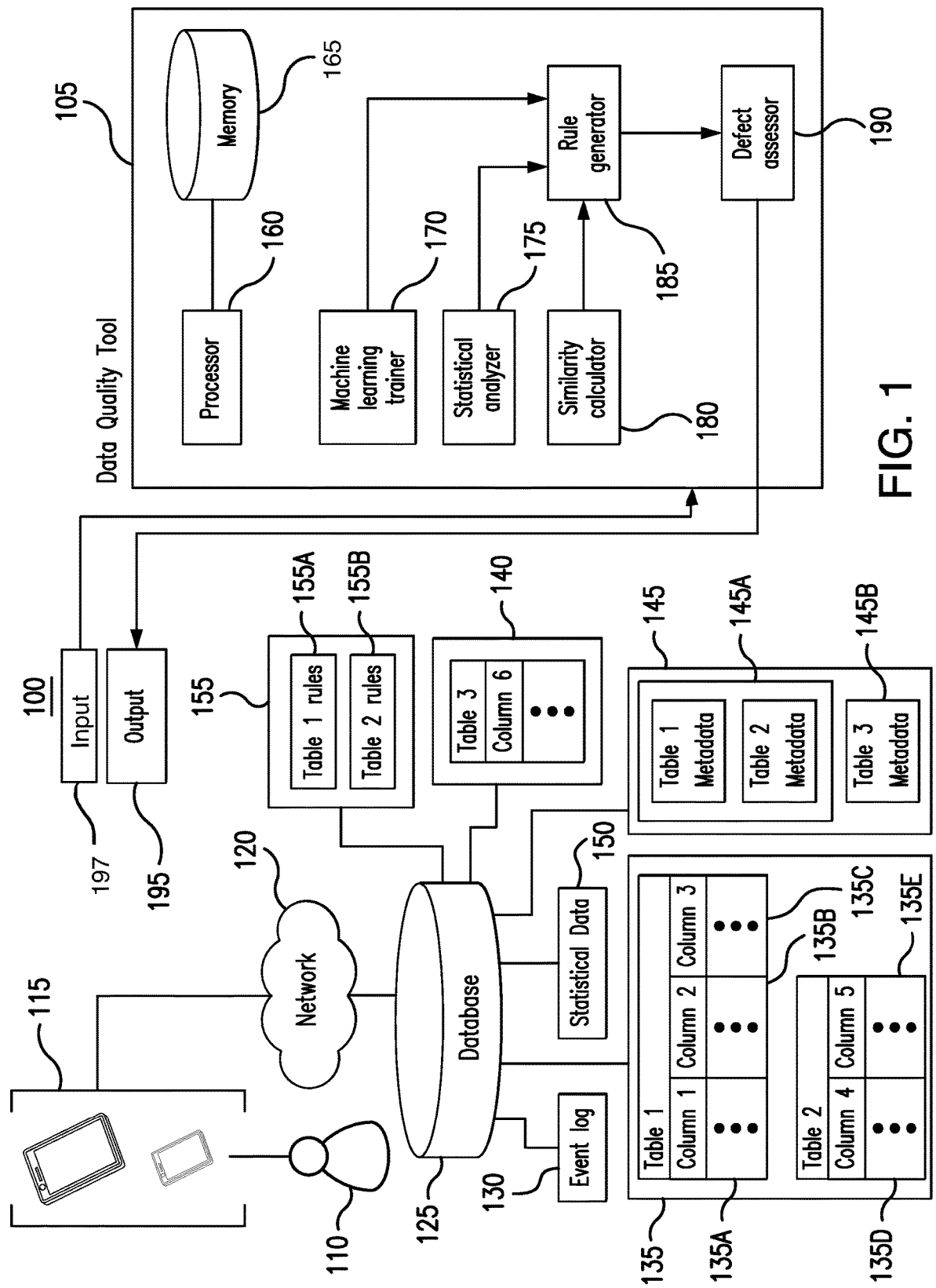
FIG. 1 illustrates an example system.

Embodiments of the present disclosure and its advantages are best understood by referring to FIGS. 1 through 7 of the drawings, like numerals being used for like and corresponding parts of the various drawings.

Organizations frequently store large quantities of data in their systems. Such data is often used internally as a basis for organizational decisions, analytics, and reporting, as well as externally by customers of the organizations and in downstream applications. Accordingly, it is important for organizations to ensure the accuracy of the data stored in their systems. To this end, organizations typically implement data quality assessment procedures to help ensure that the data is fit for use.

Data quality assessment procedures typically involve defining adequate acceptance criteria, from which data quality rules are generated, such that when applied to data stored in a system, the rules help to identify and flag suspect data for remediation. For example, a data quality rule for a column of data storing a set of dates may check that the dates are stored in a proper format, such as xx/xx/xxxx. Such a rule will label an entry in a column of dates having a value of 10/133/2004 as likely erroneous.

Typically, the data quality rules present in a system are generated manually, by system administrators. Such rules tend not to change over time and are generally not comprehensive, given the time and effort required to generate and test different data quality rules for the huge amount of data stored in a typical system. Consequently, much of the data stored in a system may undergo no more than a minimal data quality check. For example, consider again the format checking rule discussed above, for a column of data storing a set of dates. While this data quality rule provides a minimal check on the quality of the data by helping to ensure that it is logically correct from a formatting point of view, many types of errors other than formatting errors are possible for date data stored in a column. As a result, additional data quality rules are likely desirable, depending on the particular type of data stored in the column. For example, if the dates stored in the column correspond to birth dates, a second data quality rule might check to ensure that none of the dates are dates in the future. A third possible data quality rule could further check that none of the dates, when measured to the present date, result in an age greater than 150 years. Given the time and effort required to develop such comprehensive rules, it is likely not feasible to manually undertake a comprehensive rule generation process, for all the different types of data stored by a system.

Additionally, typical data quality rules are unable to take into account external and/or internal events that may influence the behavior of the data, given the static nature of manually generated rules. For example, consider a data column storing the number of new customer accounts that a business generates each month. A system administrator may observe that the values stored in this column typically do not vary by more than 20% from the average value. Therefore, the administrator may create a data quality rule that flags a column value as erroneous if it differs by more than 30% from the average value. Under such a rule, if the number of monthly accounts created in one month is greater than the average value by more than 40%, the data for that month will be labeled as erroneous. However, this increase may have been the result of an advertising campaign undertaken by the organization earlier in the month and designed to generate new accounts. If the data quality rule had knowledge of this information and could adapt accordingly, it would likely not label the corresponding data as erroneous.

This disclosure contemplates a data quality tool that addresses one or more of the above issues. The data quality tool implements a machine learning algorithm to generate comprehensive, dynamic data quality rules that take into account the influence of internal and external factors on the data. The machine learning algorithm is used to generate a set of candidate rules for a given column of data based on the metadata of the column, the statistical properties of the column, and rules that have been previously generated (either by a system administrator or the tool itself) for similar columns of data. In this manner, the tool is able to learn from previous rules generated by system administrators that may also be applicable to the column of data under consideration, as well as patterns identified in the data and its metadata, to suggest additional rules that are fit for use with the given column. The resulting set of rules may be used to generate a high-quality data quality measurement, in which any influence from internal and external factors is removed by using machine learning to identify and eliminate the effects of such factors on the data quality rule assessments. The data quality tool will be described in more detail using FIGS. 1 through 7.

FIG. 1 illustrates an example system 100. As seen in FIG. 1, system 100 includes data quality tool 105, user 110, device(s) 115, network 120, and database 125. Generally, data quality tool 105 generates a set of candidate data quality rules for a given column of data based on previously generated data quality rules for similar columns, column metadata, and statistical properties of the column. In certain embodiments, the tool further determines the influence of external and internal events on data stored in the given column, as well as the effect of such influence on the corresponding data quality assessments. In this manner, the tool is able to remove those data quality assessments that are likely incorrect, due to the presence of external or internal events altering the value of the data from what is typically expected.

Devices 115 are used by users 110 to receive data quality values as output 195 from data quality tool 105. In certain embodiments, devices 115 also send input requests 197 to data quality tool 105 seeking those data quality rules that data quality tool 105 has determined apply to a particular column of data. In such embodiments, data quality tool 105 sends the rules to device 115 as output 195. In certain embodiments, devices 115 may communicate with data quality tool 105 through network 115 via a web interface.

Devices 115 include any appropriate device for communicating with components of system 100 over network 120. For example, devices 115 may be a telephone, a mobile phone, a computer, a laptop, a tablet, a server and/or an automated assistant. This disclosure contemplates devices 115 being any appropriate device for sending and receiving communications over network 120. As an example, and not by way of limitation, device 115 may be a computer, a laptop, a wireless or cellular telephone, an electronic notebook, a personal digital assistant, a tablet, or any other device capable of receiving, processing, storing, and/or communicating information with other components of system 100. Device 115 may also include a user interface, such as a display, a microphone, keypad, or other appropriate terminal equipment usable by user 110. In some embodiments, an application executed by device 115 may perform the functions described herein. Network 120 facilitates communication between and amongst the various components of system 100. This disclosure contemplates network 120 being any suitable network operable to facilitate communication between the components of system 100. Network 120 may include any interconnecting system capable of transmitting audio, video, signals, data, messages, or any combination of the preceding. Network 120 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components.

Database 125 stores the data on which data quality tool 105 operates. In particular, database 125 stores set of columns of data 135, where each column of the set of columns 135 is stored according to a column name and a table name. For example, database 125 stores first column 135A according to column name 1, table name 1, second column 135B according to column name 2, table name 1, third column 135C according to column name 3, table name 1, fourth column 135D according to column name 4, table name 2, and fifth column 135E according to column name 5, table name 1. Database 125 also stores a subject column 140, for which data quality rules and/or a data quality value is sought. Subject column 140 is also stored according to a column name, column name 6, and a table name, table name 3.

For each column of the set of columns 135 and the subject column 140, database 125 additionally stores a set of metadata 145. Metadata 145A contains metadata assigned to each column of the set of columns 135, while metadata 145B contains metadata assigned to subject column 140. In certain embodiments, the metadata 145 that is assigned to a particular column includes information about the use of the column, information about a physical property of the column, and/or information about an availability of the column. In certain embodiments, information about the use of the column may include information about the type of data stored in the column. For example, metadata 145 may indicate that the data corresponds to an amount, a number, a flag, a ratio, a code, a percent, an identifier, a piece of text, a count, a quantity, an indicator, a time, a date, a rate, a name, a year, or a description. In certain embodiments, metadata 145 may also contain details such as Domain Names and Business Element Names, which provide information about where the data may be used. In certain embodiments, information about a physical property of the data may include the location of the data and/or transformation indicators. For example, metadata 145 may indicate the server, database, and schema where the data is stored, the data type, length, and precision of the data, the table and column of the data, or a transformation indicator for the data. Additionally, in certain embodiments, information about the availability of the column may include an indication that the data is confidential, proprietary, or public.

Database 125 additionally stores a set of data quality rules 155 previously determined for columns stored in the set of columns 135. For example, data quality tool 105 stores those rules assigned to columns 135A through 135C as table 1 rules 155A, and those rules assigned to columns 135D and 135E as table 2 rules 155B. This disclosure contemplates that rules 155 may include static data quality rules that have been manually created for columns in the set of columns 135. Additionally, rules 155 may include data quality rules that data quality tool 105 has previously generated. Example rules include a rule to check that a date stored for an event that occurred in the past (e.g. a birthday, or an account opening date) is not a date in the future, a rule to check that a piece of data falls within an allowed range for the data, and a rule to check that data associated with a particular format (e.g., a date, a social security number) is stored according to that format.

Database 125 further stores statistical data 150 related to each column of the set of columns 135 as well as the subject column 140. In certain embodiments, statistical data 150 includes the mean of the data stored in each column, the range of values of the data stored in each column, the standard deviation of the data stored in each column, and/or any other appropriate statistical measure of the data stored in a given column.

Finally, database 125 additionally stores event log 130. Event log 130 contains a list of historical events that have occurred (or are anticipated to occur in the future) and that may impact one or more pieces of data stored in the set of columns 135 and/or the subject column 140. This disclosure contemplates that event log 130 may contain internal events that have occurred within the organization to which the data belongs, as well as external events. Examples of internal events include sales/marketing campaigns, survey results, scheduled database and/or table changes, receipt of compliance reports, as well as regulatory mandates. Examples of external events include any event that may have an impact on the market to which the organization storing data in set of columns 135 belongs. For example, if the organization belongs to the financial sector, examples of external events may include the sub-prime crisis and the discovery of fraudulent accounts created by a competitor. In certain embodiments, external events are determined and stored in database 125 by data quality tool 105 using web scraping techniques.

In certain embodiments, event log 130 may additionally contain a set of inputs provided by a user 110 or administrator of data quality tool 105. For example, the set of inputs may include data changes that a user 110 or administrator anticipates will occur. Such changes may include the decommissioning of a data source, changes in an aggregation pattern or formula for a specific column of data, and/or a scheduled migration of data.

As seen in FIG. 1, data quality tool 105 includes a processor 160 and a memory 165. This disclosure contemplates processor 160 and memory 165 being configured to perform any of the functions of data quality tool 105 described herein. Generally, data quality tool 105 implements machine learning trainer 170, statistical analyzer 175, similarity calculator 180, and rule generator 185. In certain embodiments, data quality tool 105 additionally implements defect assessor 190.

Machine learning trainer 170 trains a first machine learning policy to generate a set of candidate rules for a given column of data, based on the metadata assigned to the column, the statistical properties of the column, as well as previous data quality rules assigned to the given column and/or data quality rules assigned to other columns that are similar to the given column. (Here, similar columns are determined by similarity calculator 180, as discussed below). Machine learning trainer takes as inputs columns of data from the set of columns 135—illustrated here as columns 135A through 135E—metadata 145A assigned to the columns of data, statistical properties 150 of the columns of data, rules 155 assigned to the columns of data and/or similar columns of data, and an indication of the quality of data stored in the columns of data. In certain embodiments, the indication of the quality of the column data consists of an indication for each piece of data stored in the column that the data is valid or invalid. In certain other embodiments, the indication of the quality of the column data consists of a data quality percentage indicating the percentage of the data stored in the column that is valid.

In certain embodiments, the machine learning trainer uses a deep learning model to train the machine learning policy based on the set of inputs. For example, the machine learning trainer may use a neural network algorithm, such as a backpropagation network. As other examples, the machine learning trainer may use a support vector machine, a regression model, or any other appropriate machine learning model to train the machine learning policy. This disclosure contemplates that data quality tool 105 may use multiple machine learning algorithms to associate data quality rules with given columns of data. For example, in certain embodiments, machine learning trainer 170 may use a neural network to determine potential data quality rules from the input data. Machine learning trainer 170 may then provide the potential data quality rules to a classification algorithm or a regression algorithm to determine the most accurate data quality rules for a given column.

Machine learning trainer 170 may be a software module stored in memory 165 and executed by processor 160. An example algorithm for machine learning trainer 170 is as follows: access set of columns 135, metadata 145, rules 155, and statistical data 150 stored in database 125; receive an indication of the data quality of the data stored in the set of columns 135; implement a neural network algorithm to locate patterns in the data; and associate potential data quality rules with features of the column data based on the patterns located in the data.

Data quality tool 105 uses statistical analyzer 175 to determine statistical properties for a given column of data. Such statistical properties may be used by machine learning trainer 170 in training the machine learning policy and by rule generator 185 in suggesting potential data quality rules for a given column. Statistical analyzer 175 may calculate a range of statistical properties for a given column. For example, in certain embodiments, statistical analyzer 175 determines the mean of the data stored in a given column and the range of values of the data stored in the column. In other embodiments, statistical analyzer 175 may additionally determine the standard deviation of the data stored in the column, and/or any other appropriate statistical measure of the data. Statistical analyzer 175 may be a software module stored in memory 165 and executed by processor 160. An example algorithm for statistical analyzer 175 is as follows: access a given column of data stored in database 125; determine the number of data elements stored in the column of data; set the value for the mean to zero; for each data element of the column of data add the value of the data element to the mean; divide the mean by the number of data elements; set the value for the max equal to the first element;

set the value of the min equal to the first element; for each data element of the column of data: {determine if the value of the data element is greater than the max; if the value of the data element is greater than the max set the max equal to the value of the data element; determine if the value of the data element is less than the min; if the value of the data element is less than the min, set the min equal to the value of the data element}.

Similarity calculator 180 determines those columns stored in set of columns 135 that are similar to a subject column of data 140 and provides those similar columns to rule generator 185. In certain embodiments, similarity calculator 180 additionally determines those columns stored in set of columns 135 that are similar to a given column in set of columns 135 and provides those similar columns to machine learning trainer 170.

Similarity calculator 180 determines that a given column is similar to a subset of columns of set of columns 135 based on the names of the columns and the names of the tables storing the columns. For example, consider three columns—a first column, a second column, and a third column—each column assigned a column name and stored in a table assigned a table name. Similarity calculator 180 first splits each column name into a set of features. For example, similarity calculator 180 splits the first column name into a first set of features, the second column name into a second set of features, and the third column name into a third set of features. Similarity calculator 180 then forms vectors from the features and determines the dot product between pairs of vectors. For example, similarity calculator 180 forms a first vector from the first set of features, a second vector from the second set of features and a third vector from the third set of features. Similarity calculator 180 then determines a first dot product between the first vector and the second vector, a second dot product between the first vector and the third vector, and a third dot product between the second vector and the third vector. Similarity calculator 180 next uses each dot product to determine a similarity index for each pair of vectors. Based on the values of the similarity indices between the columns, similarity calculator 180 then assigns pairs of columns to similarity groups stored in column similarity buckets. In the following discussion, it is assumed that the similarity index ranges from 0 to 1, where a similarity index value of 1 between two columns indicates that the two columns have the same column name, while a similarity index value of 0 between two columns indicates that the two columns have completely different column names. However, this disclosure contemplates that any range for the similarity indices may be used. As an example of operation, similarity calculator 180 may determine a first similarity index from the first dot product of value 0.65, a second similarity index from the second dot product of value 0.92, and a third similarity index from the third dot product of value 0.74. Accordingly, similarity calculator 180 may assign the first column and the second column to a first similarity group stored in a first column similarity bucket assigned to a similarity index range from 0.6-0.7, the first column and the third column to a second similarity group stored in a second column similarity bucket assigned to a similarity index range from 0.9-1.0, and the second column and the third column to a third similarity group stored in a third column similarity bucket assigned to a similarity index range from 0.7-0.8. In certain embodiments, similarity calculator 180 only stores those similarity groups for which the determined similarity index is greater than a threshold.

Once similarity calculator 180 has grouped columns of the set of columns 135 into column similarity buckets according to the similarity of the column names, similarity calculator 180 next groups columns within each column similarity bucket according to the similarity of the names of the tables storing the columns. This grouping is performed in the same manner as the column similarity grouping—namely, each table name is split into a set of features, vectors are formed using the features, similarity indices are determined based on the dot products between pairs of vectors, and similarity groups are stored in table similarity buckets based on the values of the similarity indices. In certain embodiments, once similarity calculator 180 has grouped columns of the set of columns 135 into table similarity buckets, similarity calculator 180 additionally groups columns within each table similarity bucket according to the similarity of the schema names associated with each table storing the columns. In certain embodiments, once similarity calculator 180 has grouped columns of the set of columns 135 into schema similarity buckets, similarity calculator 180 further groups columns within each schema similarity bucket according to the similarity of the names of the servers storing the column data.

In certain embodiments, similarity calculator 180 performs the above process a single time at the start of the operation of data quality tool 105. Similarity calculator 180 may then store the similarity buckets (and associated similarity groups) in database 125 or in memory 165. Any time new data is stored in the set of columns 135, similarity calculator 180 may then update the stored similarity buckets accordingly.

Once similarity calculator 180 has grouped columns of the set of columns 135 into similarity buckets, similarity calculator 180 is then able to use the similarity groups stored in the similarity buckets to determine those columns that are similar to a given column of data. If the given column of data is subject column 140, for which data quality rules and/or a data quality value is sought, similarity calculator 180 has not yet considered subject column 140 for grouping into one or more similarity groups. Accordingly, similarity calculator 180 first determines those similarity groups to which subject column 140 belongs. Similarity calculator 180 then determines those columns stored in the set of columns 135 that are most similar to subject column 140, by locating the column similarity bucket of the highest similarity index range which contains a similarity group to which subject column 140 belongs, and then locating the table similarity bucket assigned to that column similarity bucket of the highest similarity index range which contains a similarity group to which subject column 140 belongs. In certain embodiments, similarity calculator 180 selects those columns belonging to the similarity group to which subject column 140 belongs and which is stored according to the highest similarity index ranges compared to the other similarity groups to which subject column 140 belongs. In certain other embodiments, similarity calculator 180 selects those columns belonging to the similarity groups to which subject column 140 belongs and which are stored according to a set number of the highest similarity index ranges compared to the other similarity groups to which subject column 140 belongs. Similarity calculator 180 then passes the rules 155 assigned to these columns to rule generator 185.

Similarity calculator 180 may be a software module stored in memory 165 and executed by processor 160. An example algorithm for similarity calculator 180 is as follows: for each column in the set of columns 135, split the column name into a set of features, and form a vector from the features; determine the dot products between pairs of vectors; determine similarity indices between pairs of vectors based on the dot products; group together those columns for which the similarity indices between all pairs of columns are within a similarity index bucket range; store the groups of columns according to the similarity index bucket range; for each similarity index bucket range: {for each column within a similarity group stored in the similarity index bucket range, split the name of the table storing the column into a set of features, and form a vector from the features; determine the dot products between pairs of vectors; determine similarity indices between pairs of vectors based on the dot products; group together those columns for which the similarity indices between all pairs of columns are within a similarity index bucket range; store the groups of columns according to the similarity index bucket range}; determine that a subject column 140 belongs to a similarity group of the highest similarity index bucket range; send the rules 155 assigned to the columns stored in the similarity group to rule generator 185.

Rule generator 185 receives the machine learning policy generated by machine learning trainer 170, the statistical data 150 calculated by statistical analyzer 175 for subject column 140, and rules 155 assigned to those columns that are similar to subject column 140, as determined by similarity calculator 180. Rule generator 185 applies the machine learning policy to subject column 140, metadata 145B assigned to subject column 140, the statistical data 150 calculated by statistical analyzer 175 for subject column 140, and the rules 155 assigned to those columns that are similar to subject column 140, as determined by similarity calculator 180, to determine a first set of candidate data quality rules for subject column 140.

In certain embodiments, rule generator 185 determines a second set of candidate data quality rules for subject column 140 from the first set of candidate data quality rules, based on event log 130. For example, in certain embodiments, rule generator 185 trains a second machine learning policy using the set of columns 135, an indication of the quality of data stored in the columns of data 135, and event log 130, to determine the effect (if any) of events of the type stored in event log 130 on the data stored in the set of columns 135. Given a subject column 140, the second machine learning policy can then determine whether the reason that a given piece of data stored in subject column 140 does not comply with a rule of the first set of candidate data quality rules is because the piece of data is erroneous, or because of the influence of an event stored in event log 130. In certain embodiments, rule generator 185 uses the second machine learning policy to determine that a given piece of data stored in subject column 140 does not comply with a rule of the first set of candidate data quality rules because of the influence of an event stored in event log 130 by determining that the probability that the given piece of data does not comply with a rule of the first set of candidate data quality rules because of the influence of an event stored in event log 130 is greater than a threshold. In certain embodiments, rule generator 185 determines those candidate rules of the first set of candidate rules that, when applied to subject column 140, are likely to produce a result influenced by an event stored in event log 130 and removes them from the first set of candidate data quality rules to form a second set of candidate data quality rules.

As an example of the influence of an event stored in event log 130, consider a subject column 140 that stores the number of accounts opened by new customers of a business each month. Large deviations from an average number of account openings each month may not be typical. Accordingly, the machine learning policy determined by machine learning trainer 170 may suggest a candidate rule that indicates that a piece of data stored in the subject column 140 is erroneous if the data corresponds to a number of account openings in a given month that exceeds the average number of monthly account openings by more than 30%. As a result, if the data for the month of June indicates that 40% more accounts were opened than the average, the rule will flag this data as erroneous. However, it may be the case that the business engaged in a large advertising campaign designed to generate additional account openings early in the month of June. Accordingly, the deviation from the average is likely not a result of an incorrect input into the column of data, but a result of the successful advertising campaign. If event log 130 contains information about the advertising campaign as well as similar advertising campaigns, rule generator 185 can train the second machine learning policy to recognize the effect of advertising campaigns on various types of data. When applied to the subject column 140, the second machine learning policy can then determine that the candidate rule should not be included in the second set of candidate rules as it will not generate an accurate data quality assessment. In certain embodiments, rather than removing the candidate rule from the second set of candidate rules, the data quality tool creates a new candidate rule that is only applicable to the data in subject column 140 that the tool has determined has not been influenced by the event(s) stored in event log 130, and stores this new candidate rule in the second set of candidate rules.

In certain embodiments, rule generator 185 does not train a second machine learning policy to determine a second set of candidate data quality rules from the first set of candidate data quality rules. Rather, machine learning trainer 170 additionally trains the first machine learning policy based on event log 130 to determine those candidate rules that, when applied to subject column 140 are likely to produce a result influenced by an event stored in event log 130 and to therefore not include those rules in the set of candidate rules.

Rule generator 185 stores the second set of candidate rules (or the first set of candidate rules in embodiments in which rule generator 185 does not determine a second set of candidate rules) in the set of data quality rules 155 stored in database 125. In certain embodiments, rule generator 185 additionally sends the second set of candidate rules (or first set of candidate rules in embodiments in which rule generator 185 does not determine a second set of candidate rules) to user 110 as output 195.

Rule generator 185 may be a software module stored in memory 165 and executed by processor 160. An example algorithm for rule generator 185 is as follows: access the subject column of data 140 stored in database 125; access the metadata 145B stored in database 125 and assigned to the subject column of data 140; receive the machine learning policy from machine learning trainer 170; receive statistical properties determined for the subject column of data 140 from statistical analyzer 175; receive the data quality rules 155 assigned to similar columns of data from similarity calculator 180; apply the machine learning policy to the subject column 140, the metadata 145B, the statistical properties, and the rules assigned to similar columns of data to determine a first set of candidate data quality rules for subject column 140; access event log 130 stored in database 125; train a second machine learning policy using the set of columns 135, an indication of the quality of data stored in the columns of data 135, and event log 130, to determine the effect (if any) of events of the type stored in event log 130 on the data stored in the set of columns 135; apply the second machine learning policy to the subject column 140, the first set of candidate rules, and event log 130; for each rule in the first set of candidate rules: {determine the probability that, when applied to subject column 140, the rule will produce a result influenced by an event stored in event log 130; if the probability is less than a threshold, store the rule in the second set of candidate rules}.

In certain embodiments, after rule generator 185 has determined a set of candidate data quality rules for subject column 140, data quality tool 105 additionally implements defect assessor 190 to apply the candidate rules to subject column 140 to thereby determine a data quality value for the column. In certain embodiments, defect assessor 190 determines the data quality value by labeling each piece of data of subject column 140 as inaccurate if any of the rules in the set of candidate data quality rules indicate that the piece of data is erroneous. Defect assessor then determines the percentage of pieces of data stored in subject column 140 that are labeled as erroneous and sends this percentage to user 110 as the data quality value 195.

In certain other embodiments, defect assessor 190 determines data quality value 195 by first splitting the set of candidate data quality rules into three different categories of rules. For example, in certain embodiments, defect assessor 190 splits the set of candidate rules into a set of rules related to the completeness of the data, a set of rules related to the validity of the data, and a set of rules related to the reasonableness of the data. For each set of rules, defect assessor 190 then determines the percentage of the data stored in subject column 140 that does not comply with any of the rules in the set. For example, defect assessor 190 determines that x % of the data stored in subject column 140 does not comply with at least one of the rules related to the completeness of the data, y % of the data stored in subject column 140 does not comply with at least one of the rules related to the validity of the data, and z % of the data stored in subject column 140 does not comply with at least one of the rules related to the reasonableness of the data. Defect assessor 190 then determines values for weights assigned to each of the sets of rules. For example, defect assessor 190 determines weight $\eta_1$, $\eta_2$, and $\eta_3$, such that the data quality value for the subject column is determined as $x*\eta_1+y*\eta_2+z*\eta_3$. This may be desirable, as data quality tool 105 may determine, in generating candidate data quality rules, that certain types of rules are more likely to generate accurate data quality assessments than others. For example, consider a subject column 140 that stores the amount of money a consumer has in a checking account. Data quality tool 105 may determine that validity rules that check to ensure the value stored in the column is an amount of money rather than a piece of text, a flag, an identifier, or any other inappropriate format, are more accurate at assessing the data quality than a reasonableness rule that checks to ensure that the value stored in the column is less than a certain max value.

In certain embodiments, the values for the weights are determined based on both the type of column and the presence of similar columns in the system. For example, a given weight, $\eta_i$, may be given by $\alpha_i*\beta_i$, where at is a weight based on the type of column, and $\beta_i$ is a weight based on the presence of similar columns in the system. This may be desirable, as the presence of similar columns in the system, which are associated with previous data quality rules that have undergone testing, likely increase the probability that the data quality rules generated by data quality tool 105 produce accurate results. In certain embodiments, the values for the weights are determined by the machine learning algorithm discussed above.

In certain embodiments, in addition to determining a data quality value, defect assessor 190 further determines a data remediation priority for the subject column 140. For example, defect assessor 190 may determine that the data stored in the subject column 140 is of high data quality if the data quality value (i.e., the defect value) is less than 2%, the data is of medium data quality if the data quality value is between 2% and 5%, the data is of low quality if the data quality value is between 5% and 10%, and the data is of severely low quality if the data quality value is above 10%. Data quality tool 105 may then determine a tier priority for subject column 140 based on metadata 145B. For example, tier 1 may correspond to high risk data (e.g., confidential data), while tier 2 may correspond to medium risk data, and tier 3 may correspond to low risk data. Based on both the tier priority and the data quality value, data quality tool 105 may determine a remediation priority. For example, data quality tool 105 may determine that a subject column 140 which contains data of low quality and belongs to tier 1 should be prioritized for remediation ahead of a subject column 140 which contains data of extremely low quality and belongs to tier 3.

Defect assessor 190 may be a software module stored in memory 165 and executed by processor 160. An example algorithm for defect assessor 190 is as follows: split the set of candidate data quality rules into three different categories of rules—completeness rules, validity rules, and reasonableness rules; for each category of rules, determine the percentage of the data stored in column 140 that does not comply with any of the rules in the category; determine values for weights, $\eta_1$, $\eta_2$, and $\eta_3$, from the machine learning policy; determine the data quality value for the subject column from the weights using the formula, $x*\eta_1+y*\eta_2+z*\eta_3$, where x, y, and z are the defect percentages determined for each category of rules.

Processor 160 is any electronic circuitry, including, but not limited to microprocessors, application specific integrated circuits (ASIC), application specific instruction set processor (ASIP), and/or state machines, that communicatively couples to memory 165 and controls the operation of data quality tool 105. Processor 160 may be 8-bit, 16-bit, 32-bit, 64-bit or of any other suitable architecture. Processor 160 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. Processor 160 may include other hardware and software that operates to control and process information. Processor 160 executes software stored on memory to perform any of the functions described herein. Processor 160 controls the operation and administration of data quality tool 105 by processing information received from network 120, device(s) 115, and memory 165. Processor 160 may be a programmable logic device, a microcontroller, a microprocessor, any suitable processing device, or any suitable combination of the preceding. Processor 160 is not limited to a single processing device and may encompass multiple processing devices.

Memory 165 may store, either permanently or temporarily, data, operational software, or other information for processor 160. Memory 165 may include any one or a combination of volatile or non-volatile local or remote devices suitable for storing information. For example, memory 165 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in memory 165, a disk, a CD, or a flash drive. In particular embodiments, the software may include an application executable by processor 160 to perform one or more of the functions described herein.

In certain embodiments, memory 165 may also store the similarity groups of columns of the set of columns 135 in similarity buckets, as determined by similarity calculator 180. In this manner, similarity calculator 180 does not have to repeat the majority of each similarity calculation each time a new subject column 140 is considered.

In certain embodiments, system 100 generates dynamic data quality rules for a given column of data using a machine learning policy trained to generate the rules based on the metadata of the column, the statistical properties of the column, and rules that have been previously generated (either by a system administrator or the tool itself) for similar columns of data. In this manner, the tool is able to learn from previous rules generated by system administrators that may also be applicable to the column of data under consideration, as well as from patterns identified in the data and its metadata, to suggest additional rules that are fit for use with the given column. The resulting set of rules may be used to generate a high-quality data quality measurement, in which influences from internal and external factors are removed by using machine learning to identify the effect of such factors on the data quality rule assessments.

Figure 2:
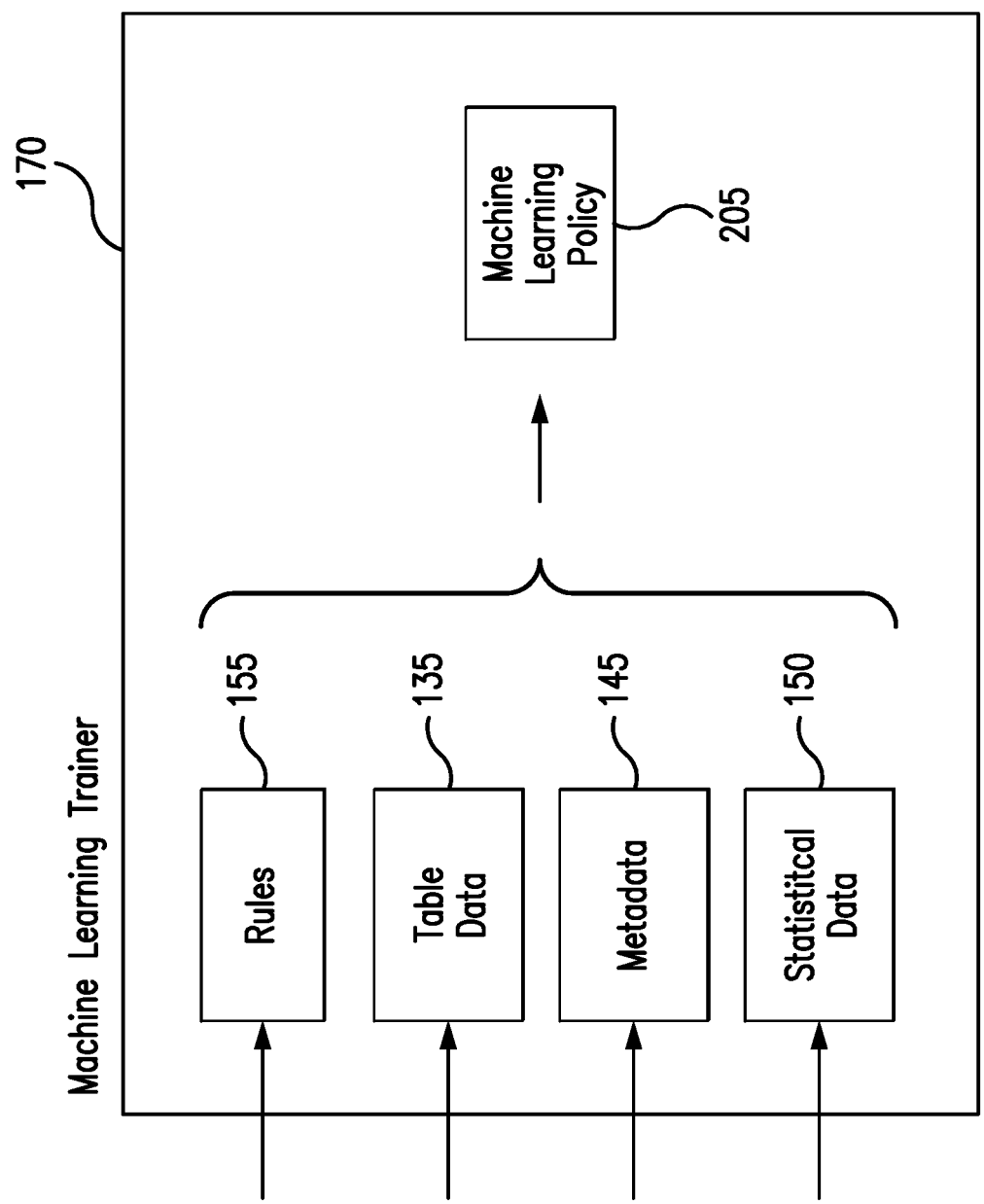
FIG. 2 illustrates an example machine learning trainer of the data quality tool in the system of FIG. 1.

FIG. 2 illustrates the machine learning trainer 170 of the data quality tool 105 of system 100. Machine learning trainer 170 trains a first machine learning policy 205 to generate a set of candidate rules for a given column of data, based on the metadata assigned to the column, the statistical properties of the column, as well as previous data quality rules assigned to the given column and/or data quality rules assigned to other columns that are similar to the given column. (Here, similar columns are determined by similarity calculator 180, as discussed in detail below, in the discussion of FIGS. 3 and 4). Machine learning trainer takes as inputs columns of data from the set of columns 135, metadata 145 assigned to the columns of data, statistical properties 150 of the columns of data, and rules 155 assigned to the columns of data and/or assigned columns of data that are similar to the given column. Additionally, machine learning trainer 170 takes as input an indication of the quality of data stored in the columns of data. In certain embodiments, such indication is stored along with the columns of data in the set of columns 135. In certain embodiments, the indication of the quality of the column data consists of an indication for each piece of data stored in the column that the data is valid or invalid. In certain other embodiments, the indication of the quality of the column data consists of a data quality percentage indicating the percentage of the data stored in the column that is valid.

In certain embodiments, the machine learning trainer uses a deep learning model to train the machine learning policy 205 based on the set of inputs. For example, the machine learning trainer may use a neural network algorithm, such as a backpropagation network. As other examples, the machine learning trainer may use a support vector machine, a regression model, or any other appropriate machine learning model to train the machine learning policy. This disclosure contemplates that data quality tool 105 may use multiple machine learning algorithms to associate data quality rules with given columns of data. For example, in certain embodiments, machine learning trainer 170 may use a neural network to determine potential data quality rules from the input data. Machine learning trainer 170 may then provide the potential data quality rules to a classification algorithm, or a regression algorithm to determine the most accurate data quality rules for a given column.

In certain embodiments, machine learning trainer 170 additionally trains machine learning policy 205 based on event log 130. In this manner, machine learning trainer 170 may train machine learning policy 205 to determine (and consequently exclude) those candidate rules that, when applied to a given column of data, are likely to produce a result influenced by an event stored in event log 130.

Figure 3:
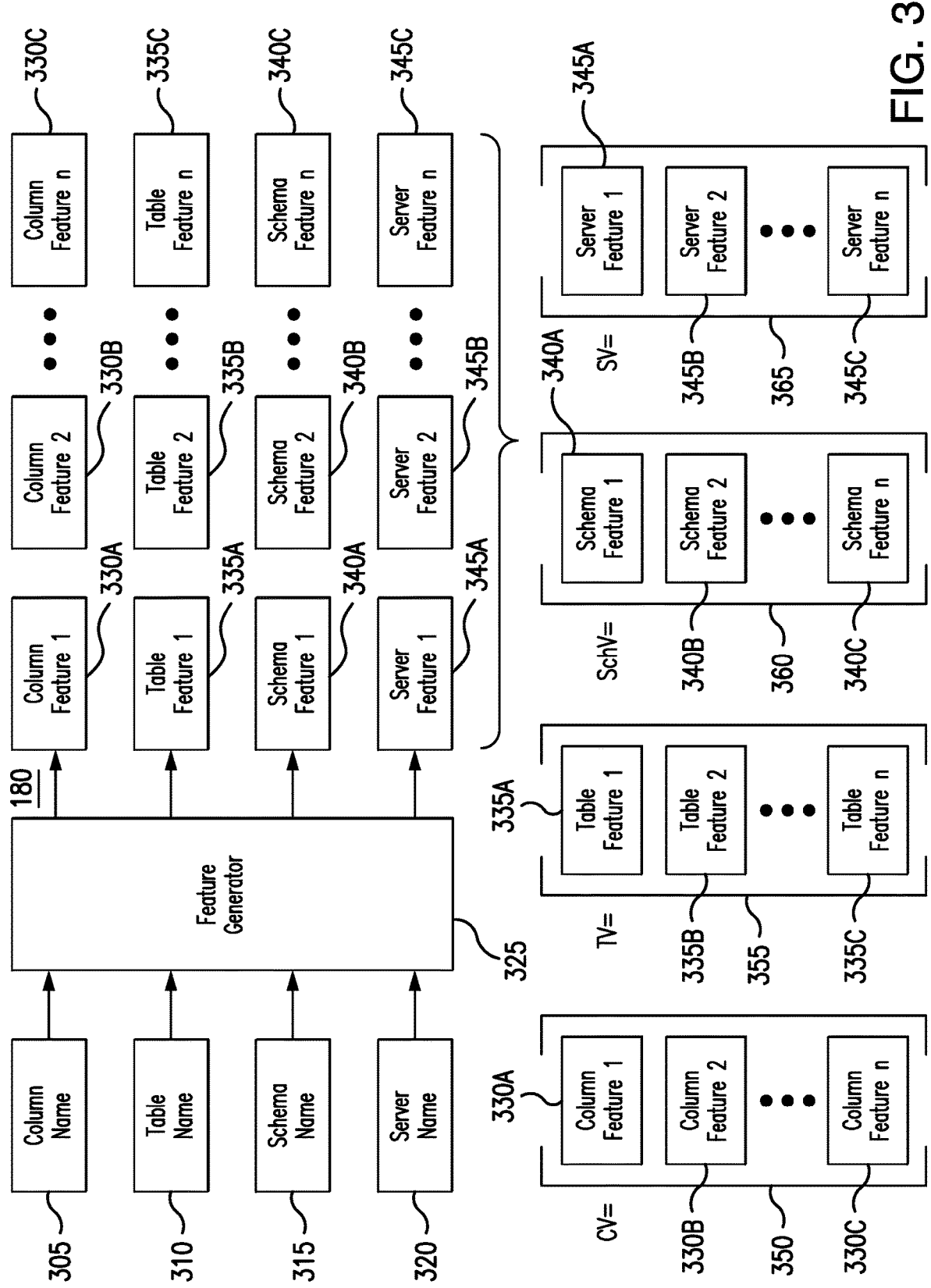
FIG. 3 illustrates the process by which the similarity calculator of the data quality tool in the system of FIG. 1 splits column names and table names into a set of features.
Figure 4:
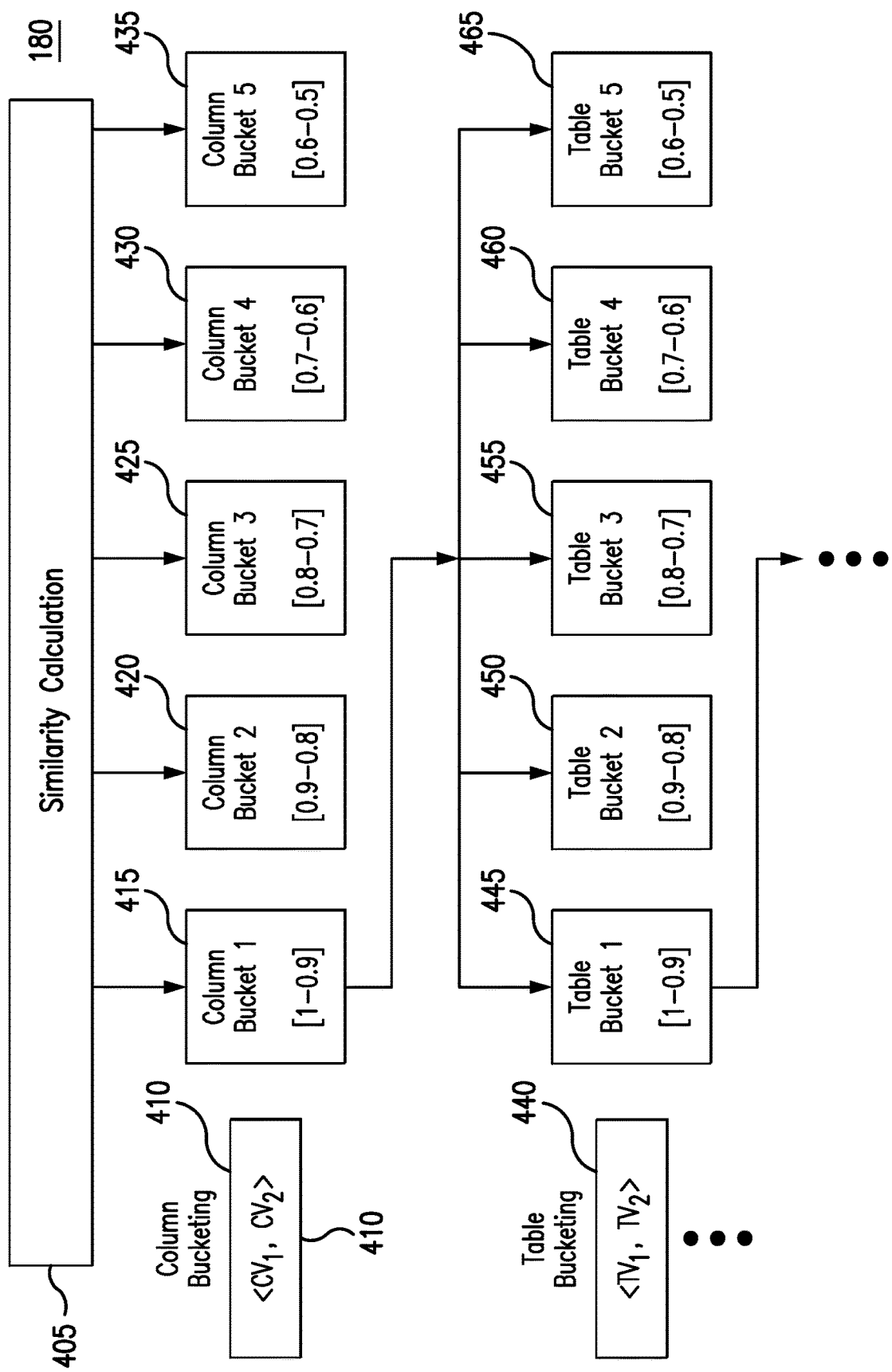
FIG. 4 illustrates an example of similarity buckets into which the similarity calculator of the data quality tool in the system of FIG. 1 stores similar columns.

FIGS. 3 and 4 provide further illustration of the process by which similarity calculator 180 groups the set of columns 135 into similarity groups stored in similarity buckets, based on the names of the columns, and the names of the tables storing the columns.

FIG. 3 illustrates the process by which similarity calculator 180 determines a set of features for a given column and forms vectors out of these features. For example, consider a column of the set of columns 135 with a column name 305, stored in a table of table name 310, stored in a schema of schema name 315, and stored on a server of server name 320. Similarity calculator 180 uses feature generator 325 to split the column name 305 into a set of column features, 330A through 330C. Similarity, similarity calculator 180 uses feature generator 325 to split the table name 310 into a set of table features, 335A through 335C. In certain embodiments, similarity calculator 180 additionally uses feature generator 325 to split the schema name 315 into a set of schema features, 340A through 340C, and the server name 320 into a set of server features, 345A through 345C. Feature generator 325 may be a software module stored in memory 165 and executed by processor 160. As an example of operation, feature generator 325 may parse a name, locating break points within the name, and split the name into features, based on the locations of the break points. For example, feature generator 325 may split a column name given by ACC_OPN_DT into the features ACC, OPN, and DT, based on the locations of the underscores in the column name.

Once similarity calculator 180 has split the column name 305 into the set of features 330A through 330C, and the table name 310 into the set of features 335A through 335C, similarity calculator 180 forms vectors out of these features. For example, similarity calculator forms column vector 350 out of column features 330A through 330C, and forms table vector 355 out of table features 335A through 335C. In certain embodiments, similarity calculator 180 additionally forms schema vector 360 out of schema features 340A through 340C, and server vector 365 out of server features 345A through 345C. Similarity calculator 180 performs this procedure for each of the columns of the set of columns 135. Similarity calculator 180 then uses these vectors to assign groups of columns into similarity groups, which it then stores in similarity buckets, as illustrated further in FIG. 4.

FIG. 4 provides an example of the similarity buckets into which similarity calculator 180 stores groups of similar columns. As can be seen in this example, similarity calculator 180 may store groups of columns of the set of columns 135 into one of five column similarity buckets, 415 through 425, based on the similarity of the names of the columns.

While this example uses five buckets, this disclosure contemplates that similarity calculator 180 may store groups of columns into any number of similarity buckets.

Similarity calculator 180 stores groups of columns into similarity buckets 415 through 425 based on the dot products 410 calculated between pairs of column vectors 350 assigned to the columns within the groups. For example, consider three column vectors 350*a* first column vector generated from a first column, a second column vector generated from a second column, and a third column vector, generated from a third column. Similarity calculator 180 performs similarity calculation 410 to determine a first dot product between the first vector and the second vector, a second dot product between the first vector and the third vector, and a third dot product between the second vector and the third vector. Similarity calculator 180 next uses each dot product to determine a similarity index for each pair of vectors, where a similarity index of 1 indicates that the columns share the same name, while a similarity index of zero indicates that the columns have completely different names. Based on the values of the similarity indices between the column vectors, similarity calculator 180 then assigns columns to similarity groups and stores the similarity groups in one or more of the similarity buckets 415 through 435. For example, similarity calculator 180 stores those similarity groups for which the similarity indices between pairs of vectors are all within the range [1.0, 0.9) in first column bucket 415, those similarity groups for which the similarity indices between pairs of vectors are all within the range [0.9, 0.8) in second column bucket 420, those similarity groups for which the similarity indices between pairs of vectors are all within the range [0.8, 0.7) in third column bucket 425, those similarity groups for which the similarity indices between pairs of vectors are all within the range [0.7, 0.6) in fourth column bucket 430, and those similarity groups for which the similarity indices between pairs of vectors are all within the range [0.6, 0.5) in fifth column bucket 435. In certain embodiments, column buckets 415 through 435 cover the entire similarity index range from 1.0 to 0.0. In other embodiments, and as is illustrated in the example of FIG. 4, column buckets 415 through 435 only cover a subset of the full similarity index range.

As a specific example of operation, consider that the first similarity index, based on the first dot product, has a value of 0.84, the second similarity index, based on the second dot product, has a value of 0.89, and the third similarity index, based on the third dot product, has a value of 0.82. Because all of these values are within the similarity index range [0.9, 0.8), similarity calculator 180 will group all three column vectors into a single similarity group and store the similarity group in the second column bucket 420. On the other hand, if the first similarity index has a value of 0.75, the second similarity index has a value of 0.96, and the third similarity index has a value of 0.82, similarity calculator 180 will store the first column and the second column as a first similarity group in the third column bucket 425, the first column and the third column as a second similarity group in the first column bucket 415, and the second column and the third column as a third similarity group in the second column bucket 420.

Once similarity calculator 180 has grouped columns of the set of columns 135 into column similarity buckets 415 through 435, according to the similarity of the column names, similarity calculator 180 next groups columns within each column similarity bucket 415 through 435 according to the similarity of the names of the tables storing the columns. This grouping is performed in the same manner as the column similarity grouping described above-namely, for the columns stored in first column bucket 415, for example, similarity calculator 180 stores groups of columns into similarity buckets 445 through 465 based on the dot products 440 calculated between pairs of table vectors 355 assigned to the columns within the groups. In certain embodiments, once similarity calculator 180 has grouped columns of the set of columns 135 into table similarity buckets 445 through 465, similarity calculator 180 additionally groups columns within each table similarity bucket 445 through 465 according to the similarity of the schema names associated with each table storing the columns. In certain embodiments, once similarity calculator 180 has grouped columns of the set of columns 135 into schema similarity buckets, similarity calculator 180 further groups columns within each schema similarity bucket according to the similarity of the names of the servers storing the column data.

In certain embodiments, similarity calculator 180 performs the above process a single time at the start of the operation of data quality tool 105. Similarity calculator 180 may then store the similarity buckets (and associated similarity groups) in database 125 or in memory 165. Any time new data is stored in the set of columns 135, similarity calculator 180 may then update the stored similarity buckets accordingly.

Once similarity calculator 180 has grouped columns of the set of columns 135 into similarity buckets, similarity calculator 180 is then able to use the similarity groups stored in the similarity buckets to determine those columns that are similar to a given column of data. If the given column of data is subject column 140, for which data quality rules and/or a data quality value is sought, similarity calculator 180 has not yet considered subject column 140 for grouping into one or more similarity groups. Accordingly, similarity calculator 180 first determines those similarity groups to which subject column 140 belongs. Similarity calculator 180 then determines those columns stored in the set of columns 135 that are most similar to subject column 140, by locating the column similarity bucket of the highest similarity index range which contains a similarity group to which subject column 140 belongs, and then locating the table similarity bucket assigned to that column similarity bucket of the highest similarity index range which contains a similarity group to which subject column 140 belongs. In certain embodiments, similarity calculator 180 selects those columns belonging to the similarity group to which subject column 140 belongs and which is stored according to the highest similarity index ranges compared to the other similarity groups to which subject column 140 belongs. For example, if similarity calculator 180 determines that subject column 140 belongs to a similarity group stored in first column bucket 415 and second table bucket 450, as well as a similarity group stored in first column bucket 415 and fourth table bucket 460, similarity calculator 180 will consider only those columns of the similarity group stored in first column bucket 415 and second table bucket 450 as similar columns. In certain other embodiments, similarity calculator 180 selects those columns belonging to the similarity groups to which subject column 140 belongs and which are stored according to a set number of the highest similarity index ranges compared to the other similarity groups to which subject column 140 belongs. For example, similarity calculator may select all similarity groups stored in first column bucket 415, and any of the first table bucket 445 through the third table bucket 455. Similarity calculator 180 then passes the rules 155 assigned to the selected columns to rule generator 185. In this manner, similarity calculator is able to provide rule generator 185 with previously determined rules for columns that are similarly named to subject column 140. Such rules may potentially provide reasonable data quality assessments when applied to subject column 140, and/or may be used to identify patterns within the rules that can be used by machine learning policy 205 to generate additional candidate rules.

Figure 5:
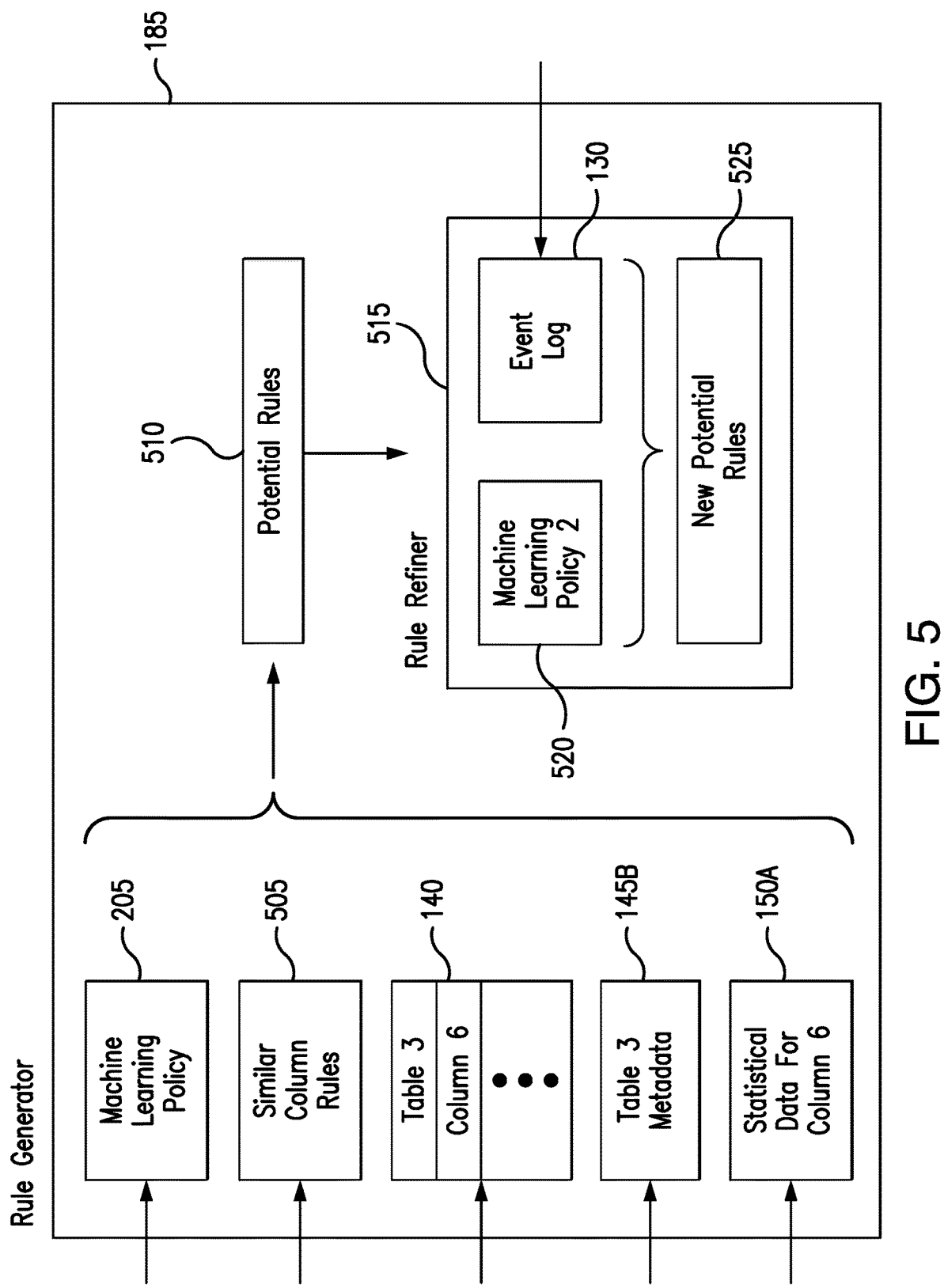
FIG. 5 illustrates an example rule generator of the data quality tool in the system of FIG. 1.

FIG. 5 illustrates rule generator 185 of the data quality tool 105 of system 100. Rule generator 185 receives, as input, machine learning policy 205 generated by machine learning trainer 170, rules 155 assigned to those columns that are similar to subject column 140, as determined by similarity calculator 180, subject column 140, metadata 145B assigned to subject column 140, and the statistical data 150A calculated by statistical analyzer 175 for subject column 140. Rule generator 185 applies machine learning policy 205 to this input data to determine a first set of candidate data quality rules 510 for subject column 140.

In certain embodiments, rule generator 185 determines a second set of candidate data quality rules 525 for subject column 140 from the first set of candidate data quality rules, based on event log 130, using rule refiner 515. For example, in certain embodiments, rule refiner 515 trains a second machine learning policy 520 using the set of columns 135, an indication of the quality of data stored in the columns of data 135, and event log 130, to determine the effect (if any) of events of the type stored in event log 130 on the data stored in the set of columns 135. Given a subject column 140, the second machine learning policy can then be used to determine whether the reason that a given piece of data stored in subject column 140 does not comply with a rule of the first set of candidate data quality rules 510 is because the piece of data is erroneous, or because of the influence of an event stored in event log 130. In certain embodiments, rule refiner 515 uses the second machine learning policy 520 to determine that a given piece of data stored in subject column 140 does not comply with a rule of the first set of candidate data quality rules 510 because of the influence of an event stored in event log 130 by determining that the probability that the given piece of data does not comply with a rule of the first set of candidate data quality rules 510 because of the influence of an event stored in event log 130 is greater than a threshold. In certain embodiments, rule refiner 515 determines those candidate rules of the first set of candidate rules 510 that, when applied to subject column 140, are likely to produce a result influenced by an event stored in event log 130 and removes them from the first set of candidate data quality rules to form a second set of candidate data quality rules 525. In certain embodiments, rather than removing the candidate rule from the second set of candidate rules 525, rule refiner 515 creates a new candidate rule that is only applicable to the data in subject column 140 that the tool determines has not been influenced by the event(s) stored in event log 130 and stores this new candidate rule in the second set of candidate rules 525.

As an example of the influence of an event stored in event log 130, consider a subject column 140 that stores the number of accounts opened by new customers of a business each month. Large deviations from an average number of account openings each month may not be typical. Accordingly, the machine learning policy 205 determined by machine learning trainer 170 may suggest a candidate rule that indicates that a piece of data stored in the subject column 140 is erroneous if the data corresponds to a number of account openings in a given month that exceeds the average number of monthly account openings by more than 30%. As a result, if the data for the month of June indicates that 40% more accounts were opened than the average, the rule will flag this data as erroneous. However, it may be the case that the business engaged in a large advertising campaign designed to generate additional account openings early in the month. Accordingly, the deviation from the average is likely not a result of an incorrect input into the column of data, but a result of the successful advertising campaign. If event log 130 contains information about the advertising campaign as well as similar advertising campaigns, rule refiner 515 can train the second machine learning policy to recognize the effect of advertising campaigns on various types of data. When applied to the subject column 140, the second machine learning policy 520 can then determine that the candidate rule should not be included in the second set of candidate rules 525 as it will not generate an accurate data quality assessment.

In certain embodiments, rule generator 185 does not train a second machine learning policy to determine a second set of candidate data quality rules 525 from the first set of candidate data quality rules 510. Instead, machine learning trainer 170 additionally trains the first machine learning policy 205 based on event log 130 to determine those candidate rules that, when applied to subject column 140 are likely to produce a result influenced by an event stored in event log 130 and to therefore not include those rules in the set of candidate rules 510.

Rule generator 185 stores the second set of candidate rules (or the first set of candidate rules in embodiments in which rule generator 185 does not determine a second set of candidate rules) in the set of data quality rules 155 stored in database 125. In certain embodiments, rule generator 185 additionally sends the second set of candidate rules (or first set of candidate rules in embodiments in which rule generator 185 does not determine a second set of candidate rules) to user 110 as output 195.

Figure 6:
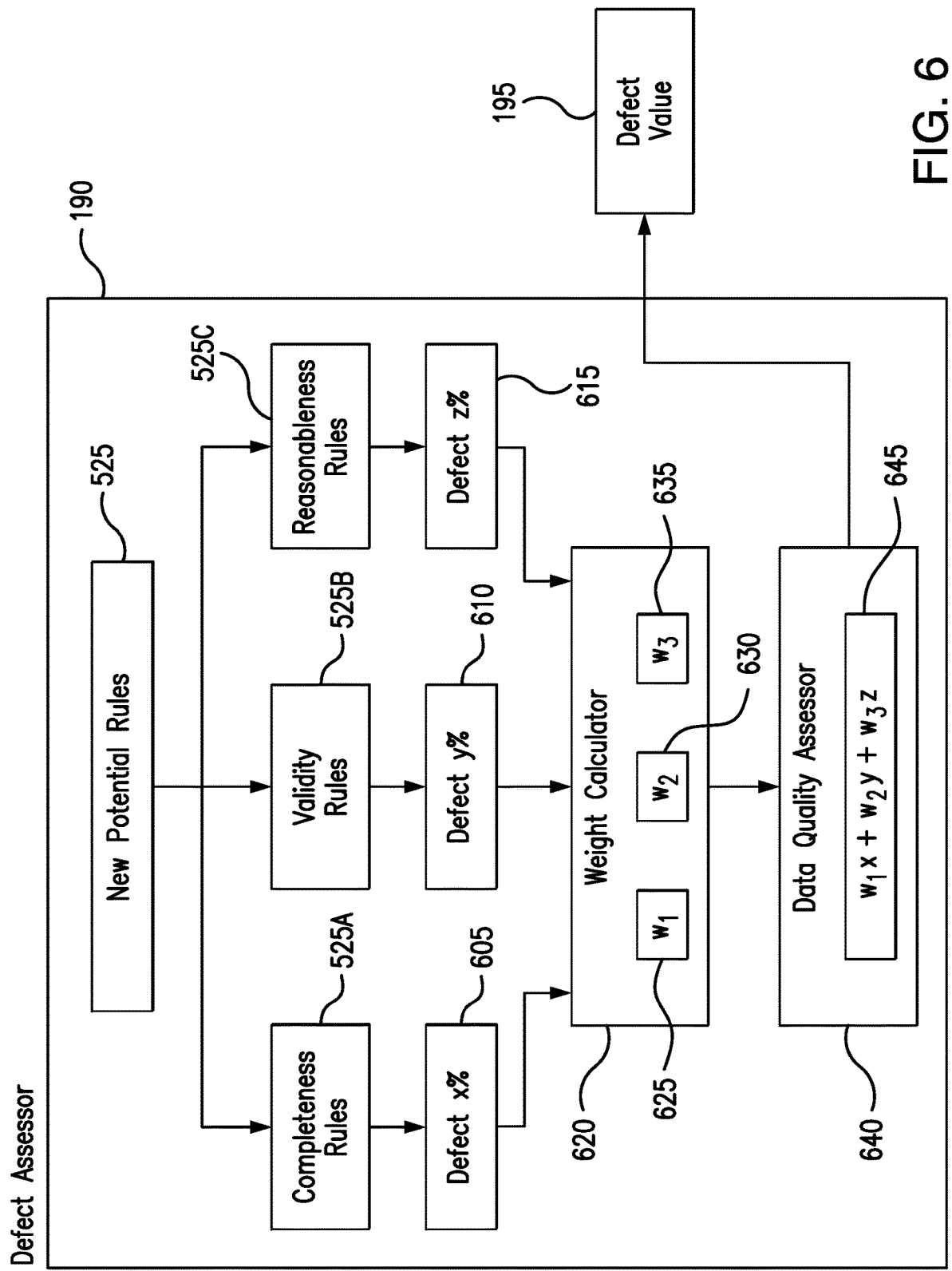
FIG. 6 illustrates an example defect assessor of the data quality tool in the system of FIG. 1.

FIG. 6 illustrates defect assessor 190 that is present in certain embodiments of the data quality tool 105 of system 100. In certain embodiments, after rule generator 185 has determined a set of candidate data quality rules for subject column 140, data quality tool 105 additionally implements defect assessor 190 to apply the candidate rules to subject column 140 to thereby determine a data quality value for the column.

In certain embodiments, defect assessor 190 performs this operation by first splitting the set of candidate data quality rules 525 into three different categories of rules. For example, in certain embodiments, defect assessor 190 splits the set of candidate rules into a set of rules 525A related to the completeness of the data, a set of rules 525B related to the validity of the data, and a set of rules 525C related to the reasonableness of the data. For each set of rules, defect assessor 190 then determines the percentage of the data stored in subject column 140 that does not comply with any of the rules in the set. For example, defect assessor 190 determines defect value 605, indicating that x % of the data stored in subject column 140 does not comply with at least one of the rules related to the completeness of the data, defect value 610, indicating that y % of the data stored in subject column 140 does not comply with at least one of the rules related to the validity of the data, and defect value 615, indicating that z % of the data stored in subject column 140 does not comply with at least one of the rules related to the reasonableness of the data. Defect assessor 190 then determines values for weights assigned to each of the sets of rules using weight calculator 620. For example, defect assessor 190 uses weight calculator 620 to determine weights 625 through 630, such that the data quality value 645 determined by data quality assessor 640 for the subject column is determined as: $x*w_1+y*w_2+z*w_3$. This may be desirable, as data quality tool 105 may determine, in generating candidate data quality rules, that certain types of rules are more likely to generate accurate data quality assessments than others. For example, consider a subject column 140 that stores the amount of money a consumer has in a checking account. Data quality tool 105 may determine that validity rules that check to ensure the value stored in the column is an amount of money rather than a piece of text, a flag, an identifier, or any other inappropriate format, are more accurate at assessing the data quality than a reasonableness rule that checks to ensure that the value stored in the column is less than a certain max value.

In certain embodiments, the values for the weights 625 through 635 are determined based on both the type of column and the presence of similar columns in the system. For example, a given weight, $w_i$, may be given by $\alpha_i*\beta_i$, where $\alpha_i$ is a weight based on the type of column, and $\beta_i$ is a weight based on the presence of similar columns in the system. This may be desirable, as the presence of similar columns in the system, which are associated with previous data quality rules that have undergone testing, likely increase the probability that the data quality rules generated by data quality tool 105 produce accurate results. In certain embodiments, the values for the weights are determined by the machine learning algorithm discussed above.

In certain embodiments, defect assessor 190 sends data quality value 645 as output 195 to user 110. This provides user 110 with an indication of the reliability of the data stored in subject column 140.

In certain embodiments, in addition to determining a data quality value, defect assessor 190 further determines a data remediation priority for the subject column 140. For example, defect assessor 190 may determine that the data stored in the subject column 140 is of high data quality if the data quality value (i.e., the defect value 195) is less than 2%, the data is of medium data quality if the data quality value is between 2% and 5%, the data is of low quality if the data quality value is between 5% and 10%, and the data is of severely low quality if the data quality value is above 10%. Data quality tool 105 may then determine a tier priority for subject column 140 based on metadata 145B. For example, tier 1 may correspond to high risk data, while tier 2 may correspond to medium risk data, and tier 3 may correspond to low risk data. Based on both the tier priority and the data quality value, data quality tool 105 may determine a remediation priority. For example, data quality tool 105 may determine that a subject column 140 which contains data of low quality and belongs to tier 1 should be prioritized for remediation ahead of a subject column 140 which contains data of extremely low quality and belongs to tier 3.

Figure 7:
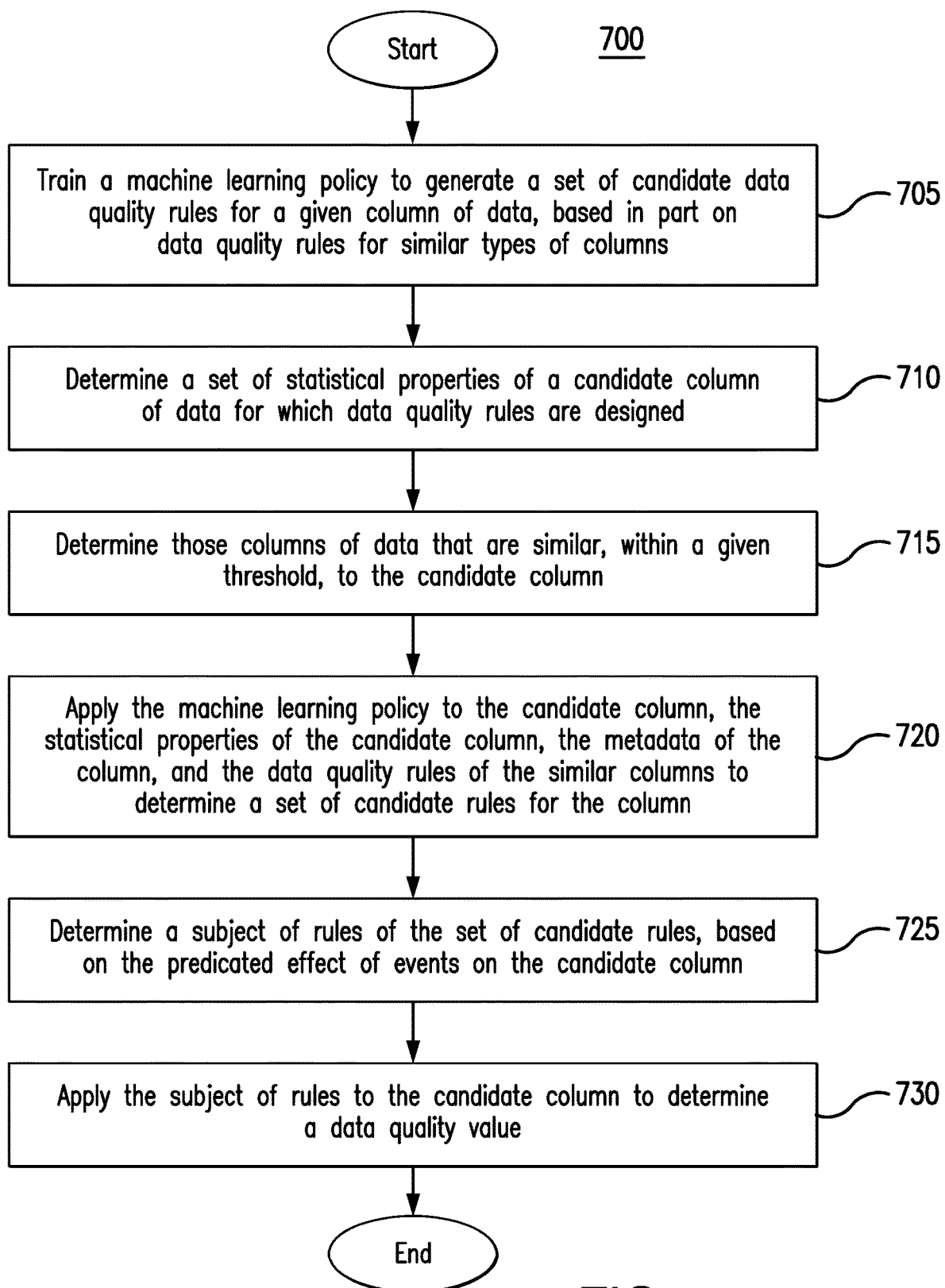
FIG. 7 presents a flowchart illustrating the process by which the data quality tool in the system of FIG. 1 determines a set of data quality rules for a given column of data.

FIG. 7 presents a flow chart illustrating the method by which the data quality tool 105 of system 100 generates and applies data quality rules to a subject column of data 140. In step 705, data quality tool 105 trains a machine learning policy 205 to generate a set of candidate data quality rules for a subject column 140, based on the columns of data from the set of columns 135, metadata 145 assigned to the columns of data, statistical properties 150 of the columns of data, and rules 155 assigned to the columns of data and/or assigned columns of data that are similar to the given column. Next, in step 710, data quality tool 105 determines statistical properties for a subject column of data 140. For example, in certain embodiments, data quality tool 105 determines the mean of the data stored in subject column of data 140 and the range of the values of the data stored in subject column of data 140. In step 715, data quality tool 105 determines those columns of data of the set of columns 135 that are similar, within a given threshold, to subject column 140, where the similar columns are determined using similarity calculator 180, as discussed in detail above, in the discussion of FIGS. 3 and 4.

Next, in step 720, data quality tool 105 applies machine learning policy 205 to subject column 140, the statistical properties calculated for the columns, the metadata of the column, and the data quality rules of the similar columns, to determine a set of candidate data quality rules 510 for the column. In step 725, data quality tool 105 then determines a subset of rules of the set of candidate data quality rules 510, based on the predicted effect of events stored in event log 140 on subject column 140. For example, in certain embodiments, data quality tool 105 uses a second machine learning policy to determine whether the reason that a given piece of data stored in subject column 140 does not comply with a rule of the set of candidate data quality rules 510 is because the piece of data is erroneous, or because of the influence of an event stored in event log 130. In certain embodiments, data quality tool 105 uses the second machine learning policy 520 to determine that a given piece of data stored in subject column 140 does not comply with a rule of the set of candidate data quality rules 510 because of the influence of an event stored in event log 130 by determining that the probability that the given piece of data does not comply with a rule of the set of candidate data quality rules 510 because of the influence of an event stored in event log 130 is greater than a threshold. In certain embodiments, data quality tool 105 determines those candidate rules of the set of candidate rules 510 that, when applied to subject column 140, are likely to produce a result influenced by an event stored in event log 130 and removes them from the set of candidate data quality rules to form a subset of candidate data quality rules 525. In certain embodiments, rather than removing the candidate rule from the subset of candidate rules 525, rule refiner 515 creates a new candidate rule that is only applicable to the data in subject column 140 that the tool determines has not been influenced by the event(s) stored in event log 130 and stores this new candidate rule in the subset of candidate rules 525.

Finally, in step 730, data quality tool 105 applies the subset of data quality rules to subject column 140 to determine a data quality value. For example, in certain embodiments, data quality tool 105 determines the data quality value by labeling each piece of data of subject column 140 as inaccurate if any of the rules in the set of candidate data quality rules indicate that the piece of data is erroneous. Data quality tool 105 then determines the percentage of pieces of data stored in subject column 140 that are labeled as erroneous and sends this percentage to user 110 as the data quality value 195. In certain embodiments, defect assessor 190 performs this operation by first splitting the set of candidate data quality rules 525 into three different categories of rules. For example, in certain embodiments, defect assessor 190 splits the set of candidate rules into a set of rules 525A related to the completeness of the data, a set of rules 525B related to the validity of the data, and a set of rules 525C related to the reasonableness of the data. For each set of rules, defect assessor 190 then determines the percentage of the data stored in subject column 140 that does not comply with any of the rules in the set. For example, defect assessor 190 determines defect value 605, indicating that x % of the data stored in subject column 140 does not comply with at least one of the rules related to the completeness of the data, defect value 610, indicating that y % of the data stored in subject column 140 does not comply with at least one of the rules related to the validity of the data, and defect value 615, indicating that z % of the data stored in subject column 140 does not comply with at least one of the rules related to the reasonableness of the data. Defect assessor 190 then determines values for weights assigned to each of the sets of rules using weight calculator 620. For example, defect assessor 190 uses weight calculator 620 to determine weights 625 through 630, such that the data quality value 645 determined by data quality assessor 640 for the subject column is determined as: $x*w_1+y*w_2+z*w_3$. This may be desirable, as data quality tool 105 may determine, in generating candidate data quality rules, that certain types of rules are more likely to generate accurate data quality assessments than others. For example, consider a subject column 140 that stores the amount of money a consumer has in a checking account. Data quality tool 105 may determine that validity rules that check to ensure the value stored in the column is an amount of money rather than a piece of text, a flag, an identifier, or any other inappropriate format, are more accurate at assessing the data quality than a reasonableness rule that checks to ensure that the value stored in the column is less than a certain max value.

Modifications, additions, or omissions may be made to method 700 depicted in FIG. 7. Method 700 may include more, fewer, or other steps. For example, steps may be performed in parallel or in any suitable order. While discussed as data quality tool 105 (or components thereof) performing the steps, any suitable component of system 100, such as device(s) 115 for example, may perform one or more steps of the method.

Although the present disclosure includes several embodiments, a myriad of changes, variations, alterations, transformations, and modifications may be suggested to one skilled in the art, and it is intended that the present disclosure encompass such changes, variations, alterations, transformations, and modifications as falling within the scope of the appended claims.

What is claimed is:

1. An apparatus comprising:
   a database configured to store:
      a set of columns comprising a first column of data and a second column of data, the first column of data assigned to a first column name and a first table name, the second column of data assigned to a second column name and a second table name;
      a first set of rules comprising a first subset of rules assigned to the first column of data and a second subset of rules assigned to the second column of data, wherein applying a rule of the first set of rules to a piece of data results in a determination that the piece of data either complies with the rule or does not comply with the rule;
      a set of metadata comprising a first subset of metadata assigned to the first column and a second subset of metadata assigned to the second column of data;
      a set of statistical data comprising a first subset of statistical data assigned to the first column of data and a second subset of statistical data assigned to the second column of data;
      a third column of data assigned to a third column name and a third table name; and
      a third subset of metadata assigned to the third column;
   a hardware processor configured to:
      determine, based in part on the first set of rules, the set of metadata, the set of statistical data, and the set of columns, a first machine learning policy adapted to generate a set of candidate rules for a given column of data;
      determine a third subset of statistical properties based on the third column of data;
      split the first column name into a first set of features;
      split the second column name into a second set of features;
      split the third column name into a third set of features;
      determine a first vector based on the first set of features;
      determine a second vector based on the second set of features;
      determine a third vector based on the third set of features;
      determine a first similarity index based on a first dot product of the first vector and the second vector;
      determine a second similarity index based on a second dot product of the first vector and the third vector;
      determine a third similarity index based on a third dot product of the second vector and the third vector;
      determine that the first similarity index is less than a first threshold;
      determine that the second similarity index is greater than the first threshold;
      determine that the third similarity index is less than the first threshold; and
      in response to determining that the second similarity index is greater than the first threshold, the first similarity index is less than the threshold, and the third similarity index is less than the threshold:
      store the first column and the third column as a first similarity group;
      split the first table name into a fourth set of features;
      split the third table name into a fifth set of features;
      determine a fourth vector from the fourth set of features;
      determine a fifth vector from the fifth set of features;
      determine a fourth similarity index based on a fourth dot product of the fourth vector and the fifth vector;
      determine that the fourth similarity index is greater than a second threshold;
      in response to determining that the fourth similarity index is greater than the second threshold:
      store the first vector and the third vector as a second similarity group; and
      apply the machine learning policy to the first subset of rules, the third subset of metadata, the third subset of statistical properties, and the third column of data to determine a first set of candidate rules for the third column of data, wherein the first set of data rules are used to improve data quality.

2. The apparatus of claim 1, wherein the first set of candidate rules for the third column of data comprises a first subset of candidate rules, a second subset of candidate rules different from the first subset of candidate rules, and a third subset of candidate rules different from the second subset of candidate rules, and the processor is further configured to:
   apply the first subset of candidate rules to each piece of data of the third column of data to determine a first percentage of pieces of data of the third column of data that do not comply with at least one of the rules of the first subset of candidate rules;
   apply the second subset of candidate rules to each piece of data of the third column of data to determine a second percentage of pieces of data of the third column of data that do not comply with at least one of the rules of the second subset of candidate rules;
apply the third subset of candidate rules to each piece of data of the third column of data to determine a third percentage of pieces of data of the third column of data that do not comply with at least one of the rules of the third subset of candidate rules; and
determine a defect value based on the first percentage, the second percentage, and the third percentage.

3. The apparatus of claim 1, wherein the third subset of statistical properties comprises at least one of a mean of the third column of data and a range of values of the third column of data.

4. The apparatus of claim 1, wherein the third set of metadata assigned to the third column of data comprises information about a use of the third column of data, information about a property of the third column of data, and information about an availability of the third column of data.

5. The apparatus of claim 1, wherein:
the database is further configured to store an event log comprising one or more events; and the processor is further configured to:
determine, based in part on the first set of candidate rules for the third column of data, the third column of data, and the event log, a second set of candidate rules for the third column of data, the first set of candidate rules for the third column of data comprising the second set of candidate rules for the third column of data, wherein determining the second set of candidate rules for the third column of data comprises:
determining that a first event of the event log affected a first piece of data of the third column of data;
determining that a first probability that a first result of applying a first rule of the first set of candidate rules to the first piece of data is affected by the first event of the event log affecting the first piece of data of the third column of data is less than a threshold;
in response to determining that the first probability that the first result of applying the first rule of the first set of candidate rules to the first piece of data is affected by the first event of the event log affecting the first piece of data of the third column is less than the threshold, storing the first rule of the first set of candidate rules in the second set of candidate rules;
determining that a second event of the event log affected a second piece of data of the third column of data;
determining that a second probability that a second result of applying a second rule of the first set of candidate rules to the second piece of data is affected by the second event of the event log affecting the second piece of data of the third column of data is greater than the threshold; and
in response to determining that the second probability that the second result of applying the second rule to the first set of candidate rules to the second piece of data is affected by the second event of the event log affecting the second piece of data of the third column is greater than the threshold, not storing the second rule of the first set of candidate rules in the second set of candidate rules.

6. The apparatus of claim 5, wherein determining the second set of candidate rules for the third column of data is further based on a set of inputs from an administrator, the set of inputs comprising a known factor that affected one or more pieces of data of the third column of data.

7. The apparatus of claim 5, wherein determining that the first probability that the first result of applying the first rule of the first set of candidate rules to the first piece of data is affected by the first event of the event log affecting the first piece of data of the third column of data is less than the threshold comprises using a second machine learning policy.

8. A method comprising:
determining, based in part on a first set of rules, a set of metadata, a set of statistical data, and a set of columns, a first machine learning policy adapted to generate a set of candidate rules for a given column of data, wherein:
the set of columns comprises a first column of data and a second column of data, the first column of data assigned to a first column name and a first table name, the second column of data assigned to a second column name and a second table name;
the first set of rules comprises a first subset of rules assigned to the first column of data and a second subset of rules assigned to the second column of data, wherein applying a rule of the first set of rules to a piece of data results in a determination that the piece of data either complies with the rule or does not comply with the rule;
the set of metadata comprises a first subset of metadata assigned to the first column and a second subset of metadata assigned to the second column of data; and
the set of statistical data comprises a first subset of statistical data assigned to the first column of data and a second subset of statistical data assigned to the second column of data;
determining a third subset of statistical properties based on a third column of data, the third column of data assigned to a third column name and a third table name;
splitting the first column name into a first set of features;
splitting the second column name into a second set of features;
splitting the third column name into a third set of features;
determining a first vector based on the first set of features;
determining a second vector based on the second set of features;
determining a third vector based on the third set of features;
determining a first similarity index based on a first dot product of the first vector and the second vector;
determining a second similarity index based on a second dot product of the first vector and the third vector;
determining a third similarity index based on a third dot product of the second vector and the third vector;
determining that the first similarity index is less than a first threshold;
determining that the second similarity index is greater than the first threshold;
determining that the third similarity index is less than the first threshold;
in response to determining that the second similarity index is greater than the first threshold, the first similarity index is less than the first threshold, and the third similarity index is less than the first threshold:
storing the first column and the third column as a first similarity group;
splitting the first table name into a fourth set of features;
splitting the third table name into a fifth set of features;
determining a fourth vector based on the fourth set of features;
determining a fifth vector based on the fifth set of features;
determining a fourth similarity index based on a fourth dot product of the fourth vector and the fifth vector;
determining that the fourth similarity index is greater than a second threshold;

in response to determining that the fourth similarity index is greater than the second threshold:
storing the first column and the third column as a second similarity group; and
applying the machine learning policy to the first subset of rules, a third subset of metadata assigned to the third column of data, the third subset of statistical properties, and the third column of data to determine a first set of candidate rules for the third column of data, wherein the first set of data rules are used to improve data quality.

9. The method of claim 8 wherein the first set of candidate rules for the third column of data comprises a first subset of candidate rules, a second subset of candidate rules different from the first subset of candidate rules, and a third subset of candidate rules different from the second subset of candidate rules, and the method further comprises:
applying the first subset of candidate rules to each piece of data of the third column of data to determine a first percentage of pieces of data of the third column of data that do not comply with at least one of the rules of the first subset of candidate rules;
applying the second subset of candidate rules to each piece of data of the third column of data to determine a second percentage of pieces of data of the third column of data that do not comply with at least one of the rules of the second subset of candidate rules;
applying the third subset of candidate rules to each piece of data of the third column of data to determine a third percentage of pieces of data of the third column of data that do not comply with at least one of the rules of the third subset of candidate rules; and
determining a defect value based on the first percentage, the second percentage, and the third percentage.

10. The method of claim 8, wherein the third subset of statistical properties comprises at least one of a mean of the third column of data and a range of values of the third column of data.

11. The method of claim 8, wherein the third subset of metadata assigned to the third column of data comprises information about a use of the third column of data, information about a property of the third column of data, and information about an availability of the third column of data.

12. The method of claim 8, further comprising:
determining, based in part on the first set of candidate rules for the third column of data, the third column of data, and an event log comprising one or more events, a second set of candidate rules for the third column of data, the first set of candidate rules for the third column of data comprising the second set of candidate rules for the third column of data, wherein determining the second set of candidate rules for the third column of data comprises:
determining that a first event of the event log affected a first piece of data of the third column of data;
determining that a first probability that a first result of applying a first rule of the first set of candidate rules to the first piece of data is affected by the first event of the event log affecting the first piece of data of the third column of data is less than a threshold;
in response to determining that the first probability that the first result of applying the first rule of the first set of candidate rules to the first piece of data is affected by the first event of the event log affecting the first piece of data of the third column is less than the threshold, storing the first rule of the first set of candidate rules in the second set of candidate rules;
determining that a second event of the event log affected a second piece of data of the third column of data;
determining that a second probability that a second result of applying a second rule of the first set of candidate rules to the second piece of data is affected by the second event of the event log affecting the second piece of data of the third column of data is greater than the threshold; and
in response to determining that the second probability that the second result of applying the second rule to the first set of candidate rules to the second piece of data is affected by the second event of the event log affecting the second piece of data of the third column is greater than the threshold, not storing the second rule of the first set of candidate rules in the second set of candidate rules.

13. The method of claim 12, wherein determining the second set of candidate rules for the third column of data is further based on a set of inputs from an administrator, the set of inputs comprising a known factor that affected one or more pieces of data of the third column of data.

14. The method of claim 12, wherein determining that the first probability that the first result of applying the first rule of the first set of candidate rules to the first piece of data is affected by the first event of the event log affecting the first piece of data of the third column of data is less than the threshold comprises using a second machine learning policy.

15. A system comprising:
a memory operable to store:
a set of columns comprising a first column of data and a second column of data, the first column of data assigned to a first column name and a first table name, the second column of data assigned to a second column name and a second table name;
a first set of rules comprising a first subset of rules assigned to the first column of data and a second subset of rules assigned to the second column of data, wherein applying a rule of the first set of rules to a piece of data results in a determination that the piece of data either complies with the rule or does not comply with the rule;
a set of metadata comprising a first subset of metadata assigned to the first column and a second subset of metadata assigned to the second column of data;
a set of statistical data comprising a first subset of statistical data assigned to the first column of data and a second subset of statistical data assigned to the second column of data;
a third column of data assigned to a third column name and a third table name; and
a third subset of metadata assigned to the third column;
a processor communicatively coupled to the memory and operable to:
determine, based in part on the first set of rules, the set of metadata, the set of statistical data, and the set of columns, a first machine learning policy adapted to generate a set of candidate rules for a given column of data;
determine a third subset of statistical properties based on the third column of data, the third subset of statistical properties comprising at least one of a mean of the third column of data and a range of values of the third column of data;
split the first column name into a first set of features;
split the second column name into a second set of features;
split the third column name into a third set of features;

determine a first vector based on the first set of features;
determine a second vector based on the second set of features;
determine a third vector based on the third set of features;
determine a first similarity index based on a first dot product of the first vector and the second vector;
determine a second similarity index based on a second dot product of the first vector and the third vector;
determine a third similarity index based on a third dot product of the second vector and the third vector;
determine that the first similarity index is less than a first threshold;
determine that the second similarity index is greater than the first threshold;
determine that the third similarity index is less than the first threshold; and
in response to determining that the second similarity index is greater than the first threshold, the first similarity index is less than the threshold, and the third similarity index is less than the threshold:
store the first column and the third column as a first similarity group;
split the first table name into a fourth set of features;
split the third table name into a fifth set of features;
determine a fourth vector from the fourth set of features;
determine a fifth vector from the fifth set of features;
determine a fourth similarity index based on a fourth dot product of the fourth vector and the fifth vector;
determine that the fourth similarity index is greater than a second threshold;
in response to determining that the fourth similarity index is greater than the second threshold:
store the first vector and the third vector as a second similarity group; and
apply the machine learning policy to the first subset of rules, the third subset of metadata, the third subset of statistical properties, and the third column of data to determine a first set of candidate rules for the third column of data, wherein the first set of data rules are used to improve data quality.

16. The system of claim 15, wherein the first set of candidate rules for the third column of data comprises a first subset of candidate rules, a second subset of candidate rules different from the first subset of candidate rules, and a third subset of candidate rules different from the second subset of candidate rules, and the processor is further operable to:
apply the first subset of candidate rules to each piece of data of the third column of data to determine a first percentage of pieces of data of the third column of data that do not comply with at least one of the rules of the first subset of candidate rules;
apply the second subset of candidate rules to each piece of data of the third column of data to determine a second percentage of pieces of data of the third column of data that do not comply with at least one of the rules of the second subset of candidate rules;
apply the third subset of candidate rules to each piece of data of the third column of data to determine a third percentage of pieces of data of the third column of data that do not comply with at least one of the rules of the third subset of candidate rules; and determine a defect value based on the first percentage, the second percentage, and the third percentage.

17. The system of claim 15, wherein the third set of metadata assigned to the third column of data comprises information about a use of the third column of data, information about a property of the third column of data, and information about an availability of the third column of data.

18. The system of claim 15, wherein:
the memory is further operable to store an event log comprising one or more events; and
the processor is further operable to:
determine, based in part on the first set of candidate rules for the third column of data, the third column of data, and the event log, a second set of candidate rules for the third column of data, the first set of candidate rules for the third column of data comprising the second set of candidate rules for the third column of data, wherein determining the second set of candidate rules for the third column of data comprises:
determining that a first event of the event log affected a first piece of data of the third column of data;
determining that a first probability that a first result of applying a first rule of the first set of candidate rules to the first piece of data is affected by the first event of the event log affecting the first piece of data of the third column of data is less than a threshold;
in response to determining that the first probability that the first result of applying the first rule of the first set of candidate rules to the first piece of data is affected by the first event of the event log affecting the first piece of data of the third column is less than the threshold, storing the first rule of the first set of candidate rules in the second set of candidate rules;
determining that a second event of the event log affected a second piece of data of the third column of data;
determining that a second probability that a second result of applying a second rule of the first set of candidate rules to the second piece of data is affected by the second event of the event log affecting the second piece of data of the third column of data is greater than the threshold; and
in response to determining that the second probability that the second result of applying the second rule to the first set of candidate rules to the second piece of data is affected by the second event of the event log affecting the second piece of data of the third column is greater than the threshold, not storing the second rule of the first set of candidate rules in the second set of candidate rules.

19. The system of claim 18, wherein determining the second set of candidate rules for the third column of data is further based on a set of inputs from an administrator, the set of inputs comprising a known factor that affected one or more pieces of data of the third column of data.

20. The system of claim 18, wherein determining that the first probability that the first result of applying the first rule of the first set of candidate rules to the first piece of data is affected by the first event of the event log affecting the first piece of data of the third column of data is less than the threshold comprises using a second machine learning policy.

* * * * *